(12) United States Patent
Davis et al.

(10) Patent No.: US 7,485,694 B2
(45) Date of Patent: Feb. 3, 2009

(54) POLYCARBONATES CONTAINING LOW LEVELS OF METHYL SALICYLATE PREPARED BY A MELT POLYMERIZATION IN A REACTIVE EXTRUDER

(75) Inventors: Peter Davis, Niskayuna, NY (US); Hans Looij, Bergen op Zoom (NL)

(73) Assignee: Sabic Innovative Plastics IP B.V., Bergen op Zoom (NL)

( * ) Notice: Subject to any disclaimer, the term of this patent is extended or adjusted under 35 U.S.C. 154(b) by 229 days.

(21) Appl. No.: 11/275,266

(22) Filed: Dec. 21, 2005

(65) Prior Publication Data

US 2007/0142612 A1 Jun. 21, 2007

(51) Int. Cl.
C08G 63/02 (2006.01)
C08G 64/00 (2006.01)

(52) U.S. Cl. ............... 528/196; 528/83; 528/183; 528/198; 562/357; 562/442

(58) Field of Classification Search ............ 264/176.1, 264/219, 328.1; 366/69, 76.7, 80, 83, 84; 422/131; 528/196, 198, 481, 501
See application file for complete search history.

(56) References Cited

U.S. PATENT DOCUMENTS

| | | | |
|---|---|---|---|
| 4,323,668 A | 4/1982 | Brunelle | |
| 5,091,591 A | 2/1992 | Cipullo | |
| 5,151,491 A | 9/1992 | Sakashita et al. | |
| 5,276,129 A | 1/1994 | Sakashita et al. | |
| 5,525,701 A | 6/1996 | Tominari et al. | |
| 5,696,222 A | 12/1997 | Kaneko et al. | |
| 6,177,536 B1 | 1/2001 | Anamizu et al. | |
| 6,252,036 B1 | 6/2001 | Hatono et al. | |
| 6,300,459 B1 | 10/2001 | Kaneko et al. | |
| 6,303,734 B1 | 10/2001 | Funakoshi et al. | |
| 6,399,739 B1 | 6/2002 | McCloskey et al. | |
| 6,403,754 B1 | 6/2002 | McCloskey et al. | |
| 6,410,777 B1 | 6/2002 | Kaneko et al. | |
| 6,417,291 B1 | 7/2002 | Kaneko et al. | |
| 6,420,512 B1 | 7/2002 | McCloskey et al. | |
| 6,420,588 B1 | 7/2002 | McCloskey et al. | |
| 6,469,192 B1 | 10/2002 | Burnell et al. | |
| 6,500,914 B1 | 12/2002 | Brack et al. | |
| 6,506,871 B1 | 1/2003 | Silvi et al. | |
| 6,518,391 B1 | 2/2003 | McCloskey et al. | |
| 6,525,163 B1 | 2/2003 | Brack et al. | |
| 6,548,623 B2 | 4/2003 | Brunelle et al. | |
| 6,590,068 B2 | 7/2003 | Brack et al. | |
| 6,600,004 B1 | 7/2003 | McCloskey et al. | |
| 6,653,434 B2 | 11/2003 | Brack et al. | |
| 6,706,846 B2 | 3/2004 | Brack et al. | |
| 6,710,156 B2 | 3/2004 | Whitney et al. | |
| 6,723,823 B2 | 4/2004 | McCloskey et al. | |
| 6,734,277 B2 | 5/2004 | Brack et al. | |
| 6,747,119 B2 | 6/2004 | Brack et al. | |
| 6,790,929 B2 | 9/2004 | Silvi et al. | |
| 6,833,096 B2 * | 12/2004 | Wang et al. ............. | 264/102 |
| 2002/0132957 A1 | 9/2002 | Brack et al. | |
| 2003/0050427 A1 | 3/2003 | Brunelle et al. | |
| 2003/0232957 A1 | 12/2003 | Silvi et al. | |
| 2004/0068086 A1 | 4/2004 | Day et al. | |
| 2004/0087756 A1 | 5/2004 | Ramesh et al. | |
| 2005/0234211 A1 | 10/2005 | Martinez et al. | |
| 2006/0069228 A1 | 3/2006 | McCloskey et al. | |

FOREIGN PATENT DOCUMENTS

| | | |
|---|---|---|
| DE | 2439552 | 2/1976 |
| JP | 5009282 | 1/1993 |
| JP | 10101786 | 4/1998 |
| JP | 10101787 | 4/1998 |
| JP | 11302228 | 11/1999 |
| JP | 2000129112 | 5/2000 |
| JP | 2002309015 | 10/2002 |
| WO | 03/010220 A1 | 2/2003 |
| WO | 03040208 | 5/2003 |
| WO | 03106149 | 12/2003 |

* cited by examiner

*Primary Examiner*—Terressa M Boykin
(74) *Attorney, Agent, or Firm*—Marina Larson & Associates, LLC

(57) ABSTRACT

Polycarbonate is prepared by reactive extrusion on a reactive extruder. A method incorporates the steps of introducing a polycarbonate oligomer, an activated carbonate residue, and a transesterification catalyst to the extruder through a feed section. The extruder has the feed section, a polycarbonate exit section, and a reaction section between the feed section and the polycarbonate exit section. The reaction section is made up of at least one conveying section, kneading sections, and venting sections. The configuration of the reaction section requires that at least one venting section be disposed between each pair of kneading sections, and that the kneading sections and venting sections are selected such that the number of venting sections minus the number of kneading sections is greater than or equal to one. The method further contains the step of extruding the reaction components at a temperature in a range between 100° C. and 500° C., wherein during the extrusion of the reaction components, activated carbonate residue is removed through the venting sections.

35 Claims, 5 Drawing Sheets

POLYCARBONATES CONTAINING LOW LEVELS OF METHYL SALICYLATE PREPARED BY A MELT POLYMERIZATION IN A REACTIVE EXTRUDER

BACKGROUND

Polycarbonates prepared by the melt reaction of dihydroxy compounds with an ester-substituted diaryl carbonate produce salicylate compounds as a by-product. For example, where polycarbonate is produced by the melt reaction of bisphenol A and bis-methyl salicyl carbonate this by-product is methyl salicylate. The reaction is fast enough to proceed in a reactive extruder. While the reaction progresses in the extruder the methyl salicylate by-product is removed through vent ports along the length of the extruder. Further, it is desirable to have only minimal amounts of the salicylate by-product in the resulting polycarbonate. It is also desirable to maximize the throughput of the extruder. However, the higher rate of throughput of the extruder results in a higher amount of the salicylate by-product produced. It would be extremely beneficial to produce polycarbonate on an extruder with a high throughput while minimizing the by-product salicylate contained in the product.

SUMMARY OF INVENTION

It has now been found that altering the screw design of a reactive extruder by replacing a kneading section with a conveying section has the surprising result of reducing the amount residual ester-substituted phenol present in the resulting product polycarbonate. In accordance with an embodiment of the present invention, a method is provided which incorporates the steps of introducing a dihydroxy compound, an activated carbonate residue, and a transesterification catalyst to an extruder through a feed section. The extruder has the feed section, a polycarbonate exit section, and a reaction section between the feed section and the polycarbonate exit section. The reaction section is made up of at least one conveying section, kneading sections, and venting sections. The configuration of the reaction section requires that at least one venting section be disposed between each pair of kneading sections, and that the kneading sections and venting sections are selected such that the number of venting sections minus the number of kneading sections is greater than or equal to one. The method further contains the step of extruding the reaction components at a temperature in a range between 100° C. and 500° C., wherein during the extrusion of the reaction components, activated carbonate residue is removed through the venting sections.

DETAILED DESCRIPTION

Figure 1:
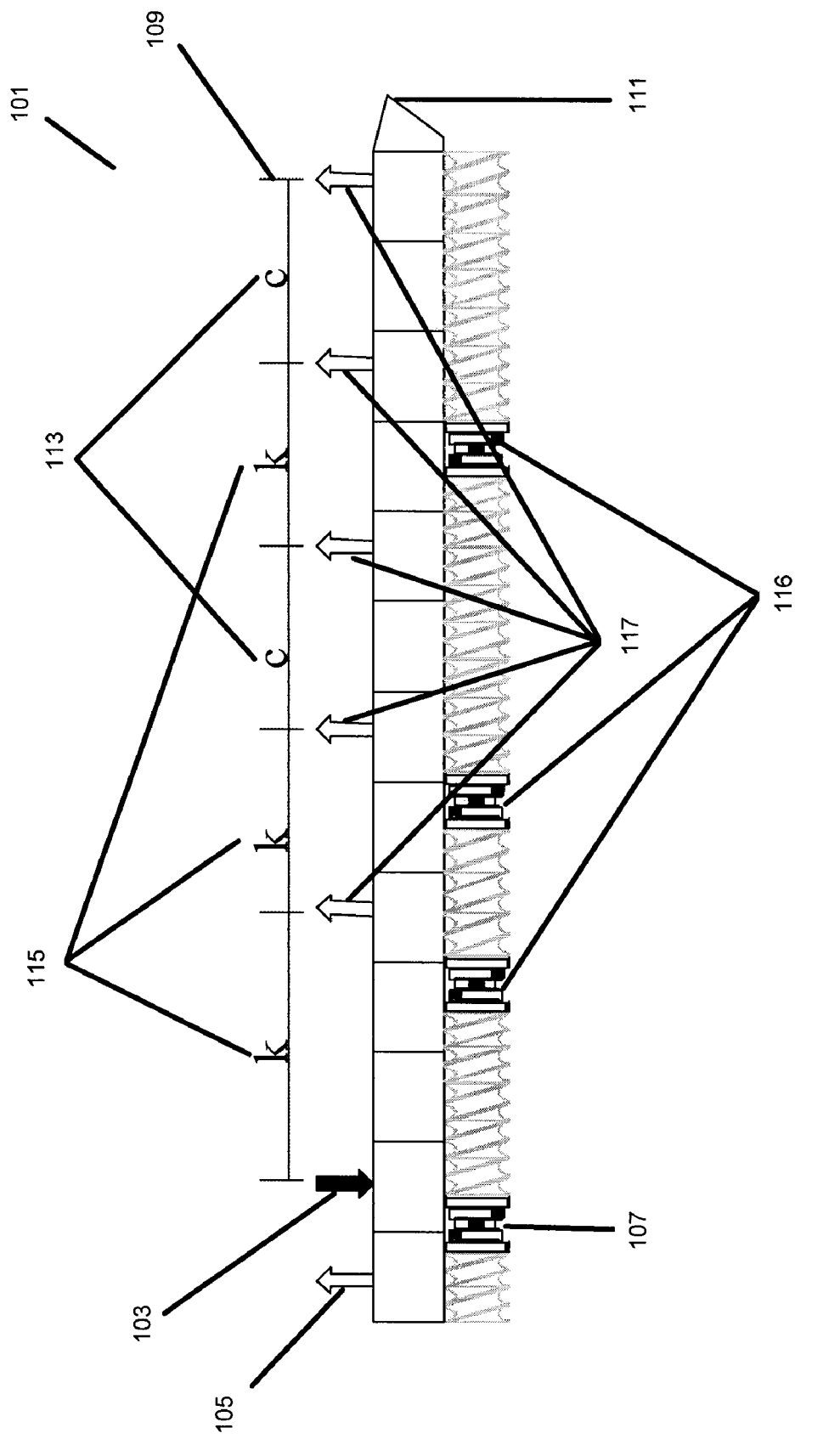
FIG. 1 shows a side view of an extruder configuration in accordance with the present invention.

U.S. Pat. Nos. 6,420,512 and 6,790,929, herein incorporated by reference, disclose processes for the melt manufacture of polycarbonate from reaction components comprising an activated diaryl carbonate on reactive devolatilization extruders. The present invention discloses a superior extruder design and a method of using the extruder design to produce polycarbonate with low levels of residual activated carbonate residue. Namely, it has now been found that altering the screw design of a reactive extruder by replacing a kneading section with a conveying section has the surprising result of significantly reducing the amount residual ester-substituted phenol present in the resulting product polycarbonate.

The present invention may be understood more readily by reference to the following detailed description of preferred embodiments of the invention and the examples included therein. In the specification and the claims which follow, reference will be made to a number of terms which shall be defined to have the following meanings:

The singular forms "a", "an" and "the" include plural referents unless the context clearly dictates otherwise.

"Optional" or "optionally" means that the subsequently described event or circumstance may or may not occur, and that the description includes instances where the event occurs and instances where it does not.

As used herein, the terms "polycarbonate oligomer" and "oligomeric polycarbonate" are synonymous and refer to a polycarbonate oligomer having a number average molecular weight of less than 7,000 Daltons and includes oligomeric polycarbonates comprising polycarbonate repeat units derived from one or more dihydroxy compounds.

As used herein, when describing a polycarbonate, the expression "polycarbonate repeat units derived from at least one dihydroxy compound" means a repeat unit incorporated into the polycarbonate by reaction of a dihydroxy compound with a source of carbonyl units, for example the reaction of bisphenol A with bis(methyl salicyl) carbonate.

As used herein, the term "high molecular weight polycarbonate" means polycarbonate having a number average molecular weight, $M_n$, of 7,000 Daltons or more.

As used herein, the term "mixture comprising an ester-substituted phenol and an oligomeric polycarbonate" refers to a liquid oligomeric polycarbonate comprising at least 5 percent by weight ester-substituted phenol.

As used herein, the term "melt polycarbonate" refers to a polycarbonate made by the transesterification of a diaryl carbonate with a dihydroxy compound.

"BPA" is herein defined as bisphenol A or 2,2-bis(4-hydroxyphenyl)propane.

The term "reaction section" as it used herein with regard to an extruder shall be understood to mean the portion of the extruder located between the first feed section and the polycarbonate exit section. The reaction section of the extruder comprises at least one conveying section, a plurality of kneading sections, and a plurality of venting sections.

The term "section(s)" as it is used herein with reference to "kneading section(s)" and "conveying section(s)" shall be understood to mean a subsection of the reaction section of the extruder between venting sections or between the first feed section and a first venting section.

The term "conveying section" is defined as a subsection of the reaction section of the extruder designed for the sole purpose of facilitating the transport of reaction components and/or polymer toward the polycarbonate exit section. The extruder screw configuration in a conveying section consists of one or more conveying elements. A conveying element is defined herein as an extruder screw element, having a spiral shaped channel, when rotated in a single operating direction (i.e. either clockwise or counterclockwise but not both) transports reaction components and/or polymer toward the polycarbonate exit section of the extruder.

The term "kneading section" is defined as a subsection of the reaction section of the extruder where intense mixing of the polymer and/or reaction components occurs. The extruder screw configuration in a kneading section comprises at least one kneading element. A kneading element is defined herein as an extruder screw element designed so that when the extruder screw is rotated, mixing of the polymer and/or reaction components occurs. A kneading element may or may not facilitate the transport of polymer and/or reaction components toward the polycarbonate exit section while mixing. A neutral screw element that does not facilitate transportation while mixing, irrespective of the direction of screw rotation (i.e. either clockwise or counterclockwise), is herein considered to be a kneading element.

To illustrate the definitions of conveying element and kneading element provided above, a screw element having a spiral shaped channel is considered to be a "conveying element" if when an extruder screw having the element is rotated in one direction (e.g. clockwise) the transportation of polymer and/or reaction components toward the polycarbonate exit section is facilitated by the element. When the same extruder screw having the same screw element is rotated in the opposite direction (e.g. counterclockwise) the same screw element would herein be considered a kneading element as the transportation of the reaction components and/or polymer toward the polycarbonate exit section would be hindered and mixing would occur.

The terms "vent port", "vent", and "venting section" are used interchangeably herein.

The term "section(s)" as it is used herein with reference to "venting section(s)" shall be understood to mean the respective part of the reaction section of the extruder located between two conveying sections, between two kneading sections, or between a conveying section and a kneading section. The final venting section is disposed between the polycarbonate exit section and the final reaction subsection (kneading or conveying).

"Polycarbonate" refers to polycarbonates incorporating repeat units derived from at least one dihydroxy compound and includes copolyestercarbonates, for example a polycarbonate comprising repeat units derived from resorcinol, bisphenol A, and dodecandioic acid. Nothing in the description and claims of this application should be taken as limiting the polycarbonate to only one dihydroxy residue unless the context is expressly limiting. Thus, the application encompasses copolycarbonates with residues of 2, 3, 4, or more types of dihydroxy compounds. The term polycarbonate refers to either oligomers or larger polymers unless the context clearly indicates otherwise.

Numerical values in the specification and claims of this application reflect average values. Furthermore, the numerical values should be understood to include numerical values which are the same when reduced to the same number of significant figures and numerical values which differ from the stated value by less than the experimental error of the measurement technique used in the present application to determine the value.

The method of the invention effects both the conversion of dihydroxy compounds, oligomeric polycarbonate, or both dihydroxy compounds and oligomeric polycarbonate to a product polycarbonate having a higher molecular weight. The method of the invention also effects a separation of the ester-substituted phenol that may be initially present in a reaction mixture or that may be created during the polymerization reaction to form the product polycarbonate. It is preferred that the product polycarbonate produced by the method of the present invention be a high molecular weight polycarbonate having a number average molecular weight, $M_n$, greater than 7,000 Daltons. Additionally, the method provides for the removal of other volatile materials which may be present in the initial reaction mixture of oligomeric polycarbonate, or formed as by-products as the reaction components are transformed in the extruder to the product polycarbonate. One embodiment of the present invention provides a method for preparing polycarbonate comprising the steps of:

(i) forming a reaction mixture comprising a dihydroxy compound, an activated carbonate, and a transesterification catalyst, and (ii) heating the reaction mixture at a temperature in a range between 100° C. and 500° C. to provide a plurality of reaction components comprising a polycarbonate oligomer, a dihydroxy compound, a transesterification catalyst, and an ester-substituted phenol having structure I,

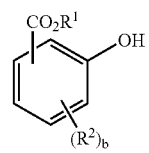

I wherein $R^1$ is a $C_1$-$C_{20}$ alkyl group, $C_4$-$C_{20}$ cycloalkyl group, or $C_4$-$C_{20}$ aryl group; $R^2$ is independently at each occurrence a halogen atom, cyano group, nitro group, $C_1$-$C_{20}$ alkyl group, $C_4$-$C_{20}$ cycloalkyl group, $C_4$-$C_{20}$ aryl group, $C_1$-$C_{20}$ alkoxy group, $C_4$-$C_{20}$ cycloalkoxy group, $C_4$-$C_{20}$ aryloxy group, $C_1$-$C_{20}$ alkylthio group, $C_4$-$C_{20}$ cycloalkylthio group, $C_4$-$C_{20}$ arylthio group, $C_1$-$C_{20}$ alkylsulfinyl group, $C_4$-$C_{20}$ cycloalkylsulfinyl group, $C_4$-$C_{20}$ arylsulfinyl group, $C_1$-$C_{20}$ alkylsulfonyl group, $C_4$-$C_{20}$ cycloalkylsulfonyl group, $C_4$-$C_{20}$ arylsulfonyl group, $C_1$-$C_{20}$ alkoxycarbonyl group, $C_4$-$C_{20}$ cycloalkoxycarbonyl group, $C_4$-$C_{20}$ aryloxycarbonyl group, $C_2$-$C_{60}$ alkylamino group, $C_6$-$C_{60}$ cycloalkylamino group, $C_5$-$C_{60}$ arylamino group, $C_1$-$C_{40}$ alkylaminocarbonyl group, $C_4$-$C_{40}$ cycloalkylaminocarbonyl group, $C_4$-$C_{40}$ arylaminocarbonyl group, or $C_1$-$C_{20}$ acylamino group; and b is an integer 0-4, (iii) introducing to an extruder through one or more feed sections, the plurality of reaction components, wherein the extruder comprises: (a) a first feed section; (b) a polycarbonate exit section; and (c) a reaction section, disposed between the first feed section and the polycarbonate exit section, the reaction section comprising a conveying section having a screw element configuration consisting of one or more conveying elements, a plurality of kneading sections wherein each kneading section has a screw element configuration comprising a kneading element, and a plurality of venting sections, wherein:

a venting section is disposed between each of the plurality kneading sections and the conveying section and a final venting section is disposed between the final kneading section and the polycarbonate exit section, and the plurality of kneading sections and the plurality of venting sections are selected such that the number of venting sections minus the number of kneading sections is greater than or equal to one, and the conveying section, the plurality of kneading sections, and the plurality of venting sections are arranged in a configuration selected from the group consisting of:

$$KV\,(KVCV)_n, \qquad (1)$$

$$(KV)_p\,(CV)_m, \text{ and} \qquad (2)$$

$$(KV)_q\,(CV)_r\,(KV)_s \qquad (3)$$

wherein K is a kneading section, V is a venting section, and C is a conveying section; n is 1, 2, or 3; p is 1, 2, or 3; m is 2, 3, or 4; q is 1, 2, or 3; r is 1 or 2; s is 1 or 2, and (iv) extruding the plurality of reaction components at a temperature in a range between 100° C. and 500° C., wherein during the extrusion of the reaction components, ester-substituted phenol is removed through the back venting section and the plurality of venting sections disposed between the feed section and the polycarbonate exit section, and polycarbonate is removed through the polycarbonate exit section.

Figure 2:
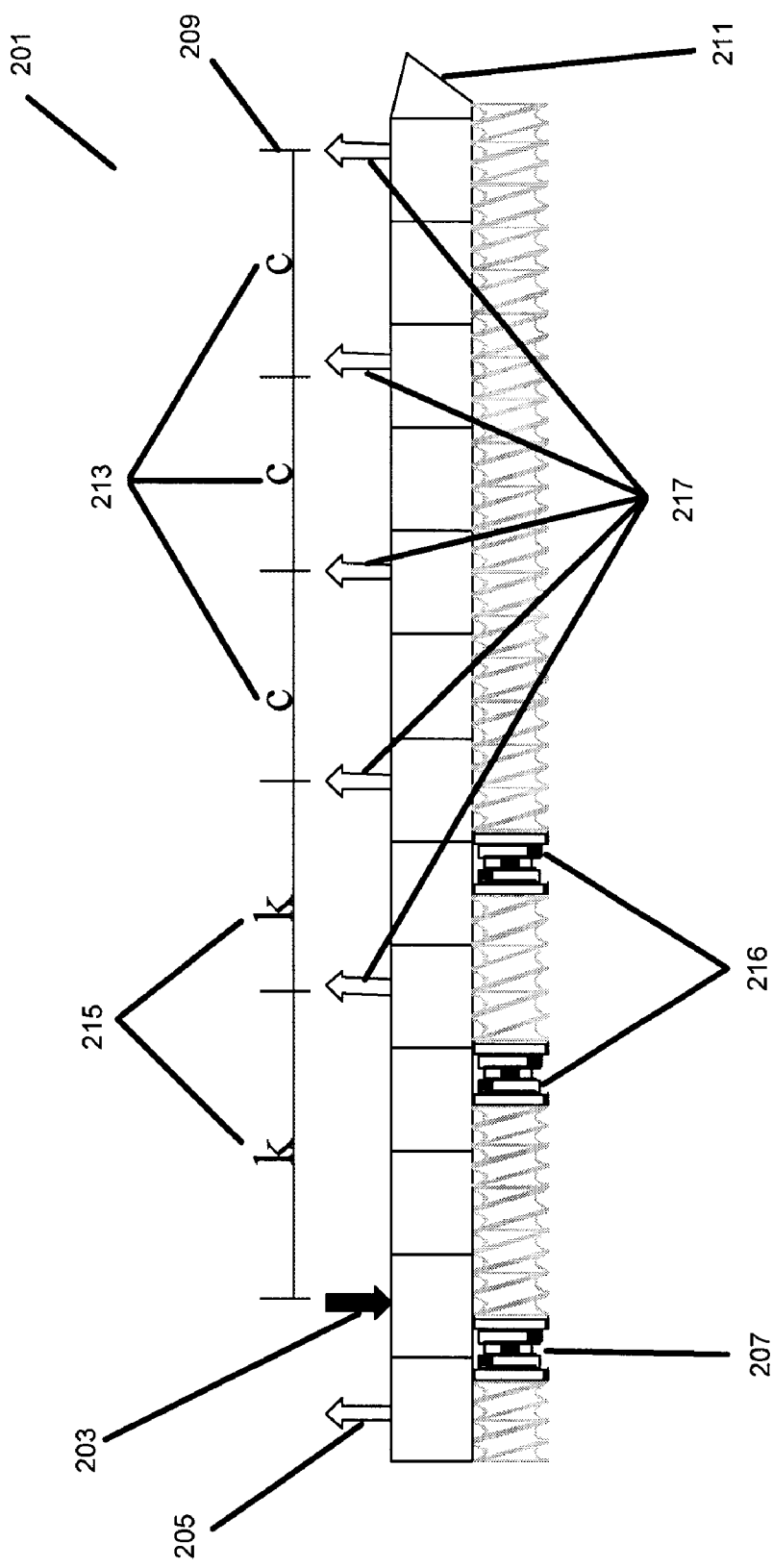
FIG. 2 shows a side view of an extruder configuration in accordance with the present invention.
Figure 3:
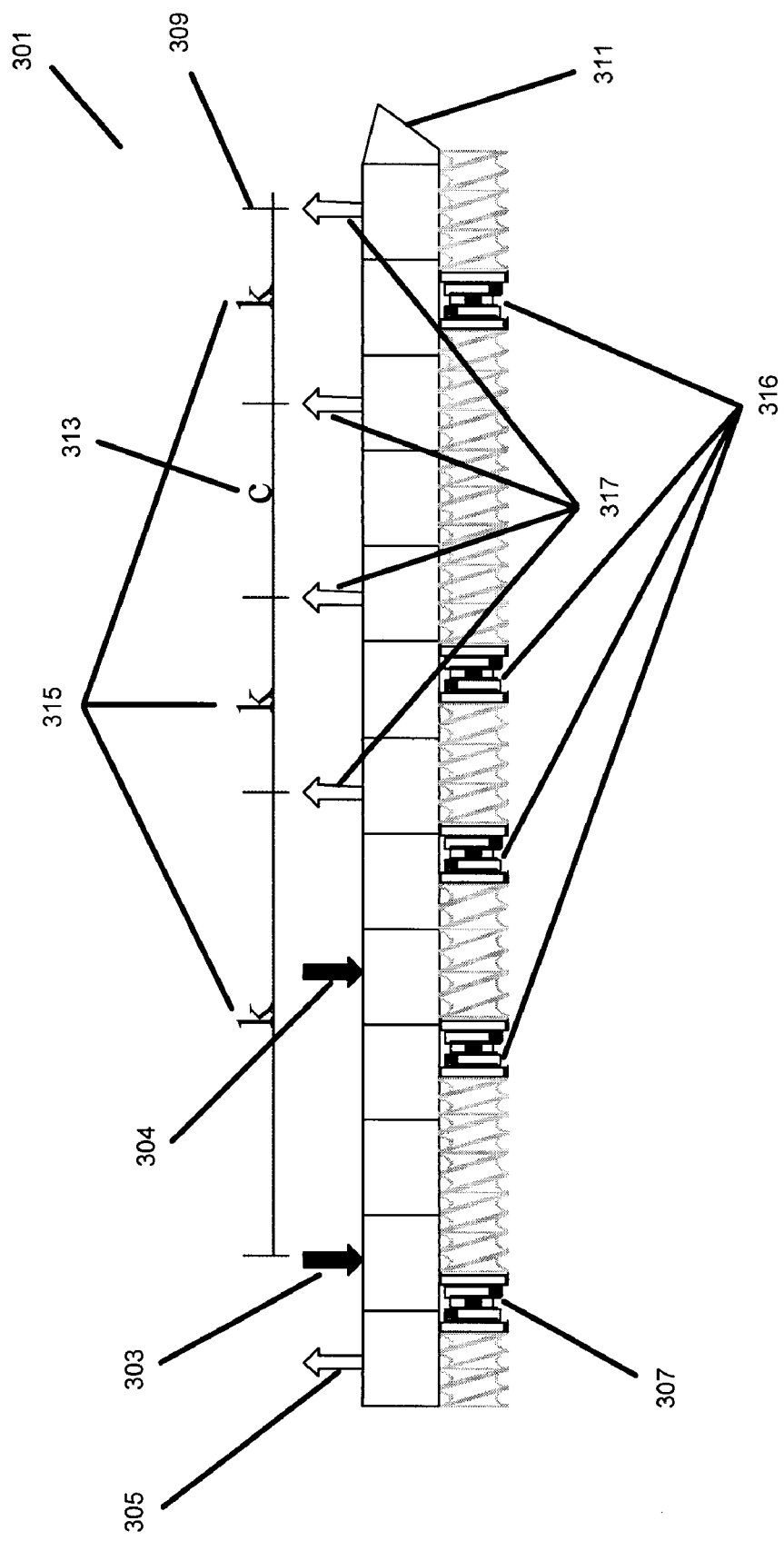
FIG. 3 shows a side view of an extruder configuration in accordance with the present invention.
Figure 4:
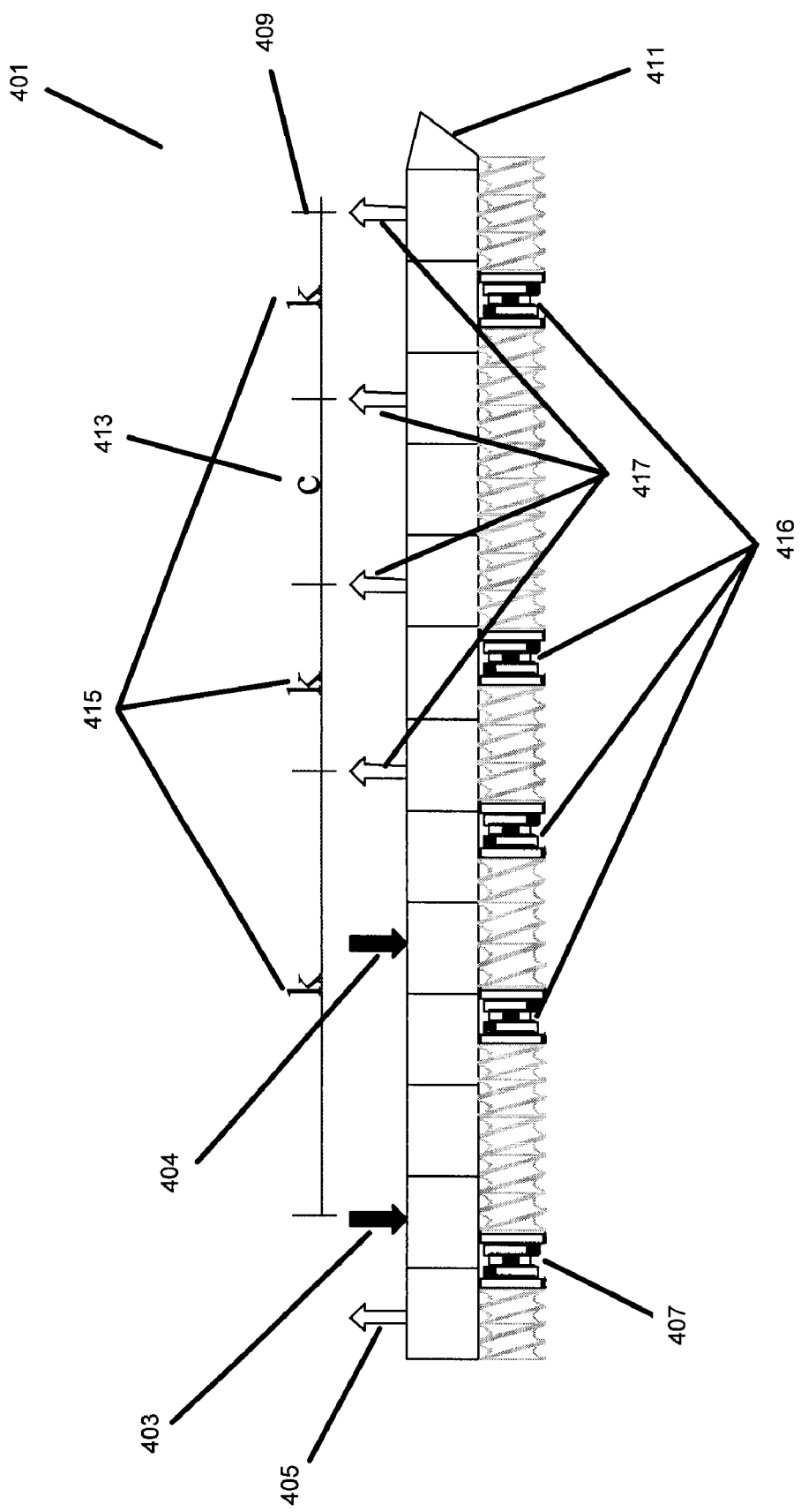
FIG. 4 shows a side view of an extruder configuration in accordance with the present invention.

The Process:

In one embodiment of the present invention, a plurality of reaction components are introduced to an extruder through at least one feed section. The plurality of reaction components comprise a dihydroxy compound, an activated carbonate residue, and a transesterification catalyst and may be introduced together as a combined reaction mixture through a single feed section (as depicted in FIGS. 1 and 2) or introduced separately through a plurality of feed sections disposed along the length of the extruder (as depicted in FIGS. 3 and 4).

In another embodiment, the plurality of reaction components introduced to the extruder further comprise an oligomeric polycarbonate that is prepared by heating a dihydroxy compound with an ester-substituted diaryl carbonate in the presence of a transesterification catalyst prior to its introduction to the extruder. The reactants are typically combined in a vessel in a ratio between 0.95 and 1.3 moles, preferably between 1.0 and 1.05 moles of ester-substituted diaryl carbonate per mole of dihydroxy compound. The amount of transesterification catalyst employed is between $1.0 \times 10^{-8}$ and $1 \times 10^{-3}$, preferably between $1.0 \times 10^{-6}$ and $2.5 \times 10^{-4}$ moles of transesterification catalyst per mole of dihydroxy compound employed. Upon heating the mixture at one or more temperatures in a range from 100° C. to 500° C., preferably from 100° C. to 300° C., and still more preferably from 150° C. to 250° C., reaction occurs to produce a mixture comprising an equilibrium mixture of oligomeric polycarbonate, by-product ester-substituted phenol, transesterification catalyst, and low levels of the starting materials, dihydroxy compound and ester-substituted diaryl carbonate. This is referred to as "equilibrating" the reactants. Typically the equilibrium strongly favors the formation of product oligomeric polycarbonate and by-product ester-substituted phenol and only traces of the starting materials are observed. The "equilibrated" product mixture is then introduced into a devolatilizing extruder to effect removal of the by-product ester-substituted phenol while converting the oligomeric polycarbonate into a higher molecular weight product polycarbonate. Because, the transesterification catalyst is typically neither consumed in the equilibration step nor removed prior to extrusion, there is typically no need to add additional catalyst during extrusion. Where no additional catalyst is added, the amount of catalyst present during the extrusion step (expressed in terms of moles catalyst per mole of polycarbonate repeat units in the oligomeric polycarbonate) will closely approximate the amount of catalyst used in the equilibration step, expressed in moles catalyst per mole dihydroxy compound. The ester-substituted phenol typically makes up from 1% to 70% by weight of the total reaction components.

In another embodiment an alpha/beta transesterification catalyst system, as described below, is employed to prepare the high molecular weight polycarbonate. In this embodiment the plurality of reaction components introduced to the extruder further comprise an oligomeric polycarbonate that is prepared by heating a dihydroxy compound with an ester-substituted diaryl carbonate in the presence of an beta transesterification catalyst prior to its introduction to the extruder. The reactants are typically combined in a vessel in a ratio between 0.95 and 1.3 moles, preferably between 1.0 and 1.05 moles of ester-substituted diaryl carbonate per mole of dihydroxy compound. The amount of alpha transesterification catalyst employed is between $1.0 \times 10^{-8}$ and $1 \times 10^{-3}$, preferably between $1.0 \times 10^{-6}$ and $2.5 \times 10^{-4}$ moles of alpha transesterification catalyst per mole of dihydroxy compound employed. Upon heating the mixture at one or more temperatures in a range from 100° C. to 500° C., preferably from 100° C. to 300° C., and still more preferably from 150° C. to 250° C., reaction occurs to produce a mixture comprising an equilibrium mixture of oligomeric polycarbonate, by-product ester-substituted phenol, transesterification catalyst, and low levels of the starting materials, dihydroxy compound and ester-substituted diaryl carbonate. This is referred to as "equilibrating" the reactants as described above. The "equilibrated" product mixture is then introduced into a devolatilizing extruder, described below, to effect removal of the by-product ester-substituted phenol while converting the oligomeric polycarbonate into a higher molecular weight product polycarbonate. In this embodiment, an alpha transesterification catalyst is introduced to the equilibrated product mixture either before its introduction to the extruder or while the product mixture is in the extruder.

The reaction components may be prepared by a variety of other methods in addition to the equilibration method described above and the method is not particularly limited. For example, oligomeric bischloroformates of bisphenols may be prepared by reaction of one or more bisphenols with phosgene under interfacial conditions in a methylene chloride water mixture at low pH. Such bischloroformates may then be further reacted under interfacial conditions with an ester-substituted phenol, for example methyl salicylate, to afford an oligomeric polycarbonate comprising ester-substituted terminal phenoxy groups in methylene chloride mixture. The product oligomeric polycarbonate in mixture may then be subjected to the method of the present invention. Catalysts employed during the interfacial reaction are typically removed from the mixture of the oligomeric polycarbonate in a series of washing steps in which the methylene chloride mixture of the oligomeric polycarbonate is washed repeatedly with water to remove sodium chloride. Under such circumstances, additional catalyst may be required and may be added during or just prior to the extrusion step.

The plurality of reaction components may be introduced to the extruder together as a combined reaction mixture or separately through additional feed sections as desired. However, it is often preferred that the reaction components be introduced as a combined mixture to the extruder through the feed section.

In one embodiment, a monofunctional phenol or an asymmetrical activated carbonate chainstopper is added to a mixture of an oligomeric polycarbonate comprising ester-substituted phenoxy terminal groups, said oligomeric polycarbonate being prepared using the equilibration technique described herein. The mixture is then subjected to extrusion devolatilization to afford a product polycarbonate incorporating terminal phenoxy groups derived from said chainstopper. Suitable monofunctional phenol chainstoppers include p-cumylphenol, t-butylphenol, phenol, and cardanol.

The Extruder and Extrusion Process:

The extruder used according to the method of the present invention is a reactive devolatilizing extruder. That is, it is an extruder adapted for separating substantial amounts of ester-substituted phenol from a mixture with the use of venting sections. Extruders suitable for use according to embodiments of the present invention include double screw extruders and other multiple screw extruders.

In one embodiment, the extruder comprises: (a) a first feed section; (b) a polycarbonate exit section; and (c) a reaction section, disposed between the first feed section and the polycarbonate exit section, the reaction section comprising at least one conveying section having a screw element configuration consisting of one or more conveying elements, a plurality of kneading sections wherein each kneading section has a screw element configuration comprising a kneading element, and a plurality of venting sections, wherein:

a venting section is disposed between each of the plurality kneading sections and the conveying section and a final venting section is disposed between the final kneading section and the polycarbonate exit section, and the plurality of kneading sections and the plurality of venting sections are selected such that the number of venting sections minus the number of kneading sections is greater than or equal to one.

In another embodiment, the at least one conveying section, the plurality of kneading sections, and the plurality of venting sections, are arranged in a configuration selected from the group consisting of:

$$KV(KVCV)_n, \quad (1)$$

$$(KV)_p(CV)_m, \text{ and} \quad (2)$$

$$(KV)_q(CV)_r(KV)_s \quad (3)$$

wherein K is a kneading section, V is a venting section, and C is a conveying section; n is 1, 2, or 3; p is 1, 2, or 3; m is 2, 3, or 4; q is 1, 2, or 3; r is 1 or 2; s is 1 or 2. It is often preferred that wherein n is 2, p is 2, m is 3, q is 2, r is 1, and s is 1.

Extruders as they are used according to embodiments of the present invention are typically operated at a temperatures in a range between 100° C. and 500° C. and at a screw speed being between 50 revolutions per minute (rpm) and 1200 rpm, preferably between 50 rpm and 500 rpm. The temperature and throughput parameters (such as screw speeds and flow rates) of the extruder operation, as well as the operating conditions used in an optional equilibration of the reaction mixture step described above, may be selected by one skilled in the art so as to minimize degradation of the dihydroxy compound used in the reaction components and to maximize the desired properties, such as transparency, of the resulting polycarbonate.

It is a general principle of extruder operation that as the feed rate is increased a corresponding increase in the screw speed must be made in order to accommodate the additional material being fed. Moreover, the screw speed determines the residence time of the material being fed to the extruder, here the reaction components comprising the oligomeric polycarbonate and transesterification catalyst. Thus the screw speed and feed rate are typically interdependent. It is useful to characterize this relationship between feed rate and screw speed as a ratio. Typically the extruder is operated such that the ratio of starting material introduced into the extruder in kilograms per hour to the screw speed expressed in rpm falls within a range of from 0.01 to 100.00, preferably from 0.05 to 1.50. For example, the ratio of feed rate to screw speed where the mixture comprising an oligomeric polycarbonate and transesterification catalyst is being introduced at 500 pounds per hour into an extruder being operated at 400 rpm is 1.25. The maximum and minimum feed rates and extruder screw speeds are determined by, among other factors, the size of the extruder, the general rule being the larger the extruder the higher the maximum and minimum feed rates.

FIG. 1 illustrates a design for a devolatilizing extruder 101 suitable for use according to an embodiment of the present invention. As illustrated in FIG. 1, a plurality of reaction components comprising a dihydroxy compound, an activated carbonate residue, and a transesterification catalyst (and optionally a polycarbonate oligomer prepared according to above) are fed to extruder 101 either together as a combined reaction mixture or separately as individual feeds through feed section 103. The extruder 101 is operated at a temperature between 100° C. and 500° C., preferably between 200° C. and 350° C., and at a screw speed between 50 and 1200 rpm. The extruder 101 is equipped with a back venting section 105 and an element 107 disposed between the back venting section 105 and the feed section 103. Preferably, as is demonstrated in FIG. 1, element 107 is a kneading element but it may also be a conveying element. The extruder further has a reaction section 109, disposed between the feed section 103 and the polycarbonate exit section 111. The reaction section 109 comprises: two conveying sections 113 having screw element configurations consisting of one or more conveying screw elements; three kneading sections 115 comprising a kneading screw elements 116, and venting sections 117. The venting sections 117 may comprise one or more vent ports that are suitably connected to house vacuum vents, other types of vacuums, or other types of manifolds for removal of ester-substituted phenol and other volatile by-products contained within the oligomeric feed and those formed as the oligomeric polycarbonate is converted into product polycarbonate within the extruder 101. The ester-substituted phenol vapors and other volatile by-products may then be condensed and recycled using standard recycling steps. In this extruder configuration 101 the number of venting sections 117 minus the number of the kneading sections 115 is two. Further the at least one conveying section, the plurality of kneading sections, and the plurality of venting sections within the reaction section are arranged in the following configuration $KV(KVCV)_n$, wherein K is a kneading section, V is a venting section, C is a conveying section, and n is two.

FIG. 2 illustrates a design for a devolatilizing extruder 201, suitably operated at the conditions mentioned above, for use according to another embodiment of the present invention. As illustrated in FIG. 2, a plurality of reaction components are fed to extruder 201 through feed section 203. Extruder 201 is equipped with a back venting section 205 and an element 207 disposed between the back venting section 205 and the feed section 203. As in FIG. 1, element 207 is a kneading element. The extruder 201 further has a reaction section 209, disposed between the feed section 203 and the polycarbonate exit section 211. The reaction section 209 comprises: three conveying sections 213 having screw element configurations consisting of one or more conveying screw elements; a plurality of kneading sections 215 comprising a kneading screw element 216, and venting sections 217 suitably connected to a vacuum for ester-substituted phenol removal. In this extruder configuration 201 the number of venting sections 217 minus the number of the kneading sections 215 is three. Further the at least one conveying section 213, the plurality of kneading sections 215, and the plurality of venting sections 217 are arranged in the following configuration $(KV)_p(CV)_m$, wherein K is a kneading section, V is a venting section, C is a conveying section, p is two, and m is 3.

FIG. 3 illustrates yet another design for a devolatilizing extruder 301, suitably operated at the conditions mentioned above, for use according to an embodiment of the present invention. As illustrated in FIG. 3, a plurality of reaction components are fed to extruder 301 through feed sections 303, 304. The reaction components may be introduced together as a mixture or separately as individual components or as any combination of components through feed sections 303, 304. Extruder 301 is equipped with a back venting section 305 and an element 307 disposed between the back venting section 305 and the first feed section 303. As in FIGS. 1 and 2, element 307 is a kneading element, however, it may also be a conveying element. The extruder 301 further has a reaction section 309, disposed between the first feed section 303 and the polycarbonate exit section 311. The reaction section 309 comprises: one conveying section 313 having screw element configurations consisting of one or more conveying screw elements; three kneading sections 315 each comprising at least one kneading screw element 316 wherein the first kneading section comprises two kneading screw elements 316, and four venting sections 317 suitably connected to a vacuum for ester-substituted phenol removal. In this extruder configuration 301 the number of venting sections 317 minus the number of the kneading sections 315 is one. Further the at least one conveying section 313, the plurality of kneading sections 315, and the plurality of venting sections 317 are arranged in the following configuration $(KV)_q (CV)_r (KV)_s$, wherein K is a kneading section, V is a venting section, C is a conveying section, q is two, r is 1, and s is 1.

FIG. 4 illustrates yet another design for a devolatilizing extruder 401, suitably operated at the conditions mentioned above, for use according to an embodiment of the present invention. As illustrated in FIG. 4, a plurality of reaction components are fed to extruder 401 through feed sections 403, 404. The reaction components may be introduced together as a mixture or separately as individual components or as any combination of components through feed sections 403, 404. Extruder 401 is equipped with a back venting section 405 and an element 407 disposed between the back venting section 405 and the first feed section 403. As in FIGS. 1, 2, and 3 element 407 is preferably a kneading element, however, it may also be a conveying element. The extruder 401 further has a reaction section 409, disposed between the first feed section 403 and the polycarbonate exit section 411. The reaction section 409 comprises: one conveying section 413 having screw element configurations consisting of one or more conveying screw elements; three kneading sections 415 each comprising at least one kneading screw element 416 wherein the second kneading section comprises two kneading screw elements 416, and four venting sections 417 suitably connected to a vacuum for ester-substituted phenol removal. In this extruder configuration 401 the number of venting sections 417 minus the number of the kneading sections 415 is one. Further the at least one conveying section 413, the plurality of kneading sections 415, and the plurality of venting sections 417 are arranged in the following configuration $(KV)_q (CV)_r (KV)_s$, wherein K is a kneading section, V is a venting section, C is a conveying section, q is two, r is 1, and s is 1.

In one embodiment of the present invention, a mixture of an oligomeric polycarbonate and an ester-substituted phenol is heated under pressure to produce a "superheated" mixture, meaning that the temperature of said superheated mixture is greater than the boiling point of the ester-substituted phenol at a flash pressure. Typically, the temperature of the superheated oligomeric polycarbonate will be between 2° C. and 200° C. higher than the boiling point of the ester-substituted phenol at the flash pressure. Superheating of the mixture of the oligomeric polycarbonate may be achieved by heating the mixture under pressure, typically at a pressure less than 10 atmospheres. Superheated mixtures of oligomeric polycarbonates are conveniently prepared in pressurized heated feed tanks, pressurized heat exchangers, extruders, pressurized reaction vessels and the like. The superheated mixture is then introduced into the vented devolatilizing extruder through a pressure control valve having a cracking pressure higher than the flash. The back pressure generated by the pressure control valve prevents evaporation of the ester-substituted phenol prior to introducing the mixture into the extruder. Typically, the pressure control valve is attached (plumbed) directly to the extruder and serves as the principal feed inlet of the vented extruder. The ratio of the pressure of the first venting section/feed pressure is typically in a range of greater than 0.01 and less than 1.00, and sometimes more preferably from 0.10 to 1.00.

The extruder can be equipped with at least one side feeder which is operated as a vent. The vented extruder in combination with the side feeder can be equipped with one or more back vents in close proximity to the principal feed inlet comprising the pressure control valve. The side feeder is typically positioned in close proximity to the pressure control valve through which the superheated oligomeric polycarbonate is introduced into the extruder. The side feeder comprises at least one vent. Alternatively, the pressure control valve through which the superheated oligomeric polycarbonate is introduced may be attached to the side feeder itself in which instance the pressure control valve is attached to the side feeder at a position between the point of attachment of the side feeder to the extruder and the atmospheric vent located on the side feeder. In yet another embodiment, the superheated mixture of oligomeric polycarbonate may be introduced through multiple pressure control valves which may be attached to the side feeder, the extruder, or to both extruder and side feeder. The heated zones of the extruder are typically operated at one or more temperatures between 100° C. and 400° C. The expression "wherein the extruder is operated at a temperature between 100° C. and 400° C." refers to the heated zones of the extruder, it being understood that the extruder may comprise both heated and unheated zones, and operating at more than one temperature.

In another embodiment the superheated mixture of oligomeric polycarbonate passes through the pressure control valve into the feed section of the extruder which due to the presence of the aforementioned vents is at sub-atmospheric pressure. The ester-substituted phenol present in the superheated mixture of oligomeric polycarbonate undergoes sudden and rapid evaporation thereby effecting at least partial separation of the oligomeric polycarbonate and the ester-substituted phenol. The ester-substituted phenol vapors then are eliminated from the extruder via the back vents and forward vents. The vents can be attached to a ester-substituted phenol vapor manifold and condenser in order to recover ester-substituted phenol and prevent its adventitious release.

The venting sections of the reaction section may be operated above, at, or below atmospheric pressure. However, it is preferred that the venting sections be operated at or below atmospheric pressure. Venting sections operated at sub-atmospheric pressure are referred to herein as "vacuum vents" and are maintained between 1 mbar to 1 bar, preferably between 1 mbar to 100 mbar by a vacuum gauge measuring vacuum (as opposed to a pressure gauge measuring pressure). Typically, at least two vacuum venting sections are preferred.

In some instances, it may be found that the product polycarbonate prepared according to the method of the present invention is of insufficient molecular weight or retains too much of the ester-substituted phenol originally present in the mixture of the oligomeric polycarbonate. In such instances, simply subjecting the product polycarbonate to a second extrusion on the same or a different devolatilizing extruder typically results in a product polycarbonate having an increased molecular weight and a reduced level of residual ester-substituted phenol. Thus, in one embodiment of the present invention, the methods described above are performed on an extruder of the present invention thereby resulting in an initial product polycarbonate. The initial product polycarbonate is then introduced into a second extruder being equipped with at least one vacuum vent. The second extruder is operated at a temperature in a range between 100° C. and 500° C., and at a screw speed in a range between 50 and 1,200 rpm, thereby producing a final product polycarbonate.

The method of the present invention may be carried out in a batch or continuous mode. In one embodiment, the method of the present invention is carried out as a batch process wherein monomers, i.e. the dihydroxy compound, and transesterification catalyst are equilibrated in a batch reactor to form a mixture of the oligomeric polycarbonate. This mixture is then fed to a vented devolatilizing extruder and the product polycarbonate is isolated until the mixture is consumed. Alternatively, the method of the present invention may be carried out as a continuous process wherein dihydroxy compound, catalyst, and an ester-substituted diaryl carbonate are continuously fed to, and a mixture of oligomeric polycarbonate is continuously removed from a continuous reactor. Thus a mixture of BMSC, BPA and/or other dihydroxy compounds, and a transesterification catalyst may be fed to one end of a tube reactor heated to a temperature between 160° C. and 250° C., while a mixture of an oligomeric polycarbonate emerges at the opposite end of the tube reactor that is fed to the vented devolatilizing extruder from which emerges the product polycarbonate.

The Activated Diaryl Carbonate:

The activated carbonate is preferably derived from an activated diaryl dicarbonate or a mixture of an activated diaryl carbonate and diphenyl carbonate. A preferred activated diaryl carbonate of the present invention is an activated diaryl carbonate such as bismethylsalicylcarbonate (BMSC). However, as used herein the term "activated diaryl carbonate" is defined as a diarylcarbonate which is more reactive than diphenylcarbonate toward transesterification reactions. Such activated carbonates are of the general formula:

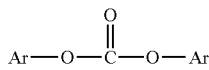

wherein Ar is a substituted aromatic radical having 6 to 30 carbon atoms. The preferred activated carbonates have the more specific general formula:

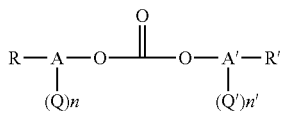

wherein Q and Q' are each independently activating groups. A and A' are each independently aromatic rings which can be the same or different depending on the number and location of their substituent groups, and n or n' are whole numbers of zero up to a maximum equivalent to the number of replaceable hydrogen groups substituted on the aromatic rings A and A', wherein n+n' is greater than or equal to 1. R and R' are each independently substituent groups such as alkyl, substituted alkyl, cycloalkyl, alkoxy, aryl, alkylaryl, cyano, nitro, halogen, and carboalkoxy. The number of R groups is a whole number and can be 0 up to a maximum equivalent to the number of replaceable hydrogen groups on the aromatic rings A minus the number n. The number of R' groups is a whole number and can be 0 up to a maximum equivalent to the number of replaceable hydrogen groups on the aromatic rings A minus the number n'. The number and type of the R and R' substituents on the aromatic ring are not limited unless they deactivate the carbonate and lead to a carbonate which is less reactive than diphenylcarbonate. Typically, the location of the R and R' substituents on the aromatic ring are any one or any combination of the para and/or two ortho positions.

Non-limiting examples of activating groups Q and Q' are: alkoxycarbonyl groups, halogens, nitro groups, amide groups, sulfone groups, sulfoxide groups, cyano groups or imine groups with structures indicated below:

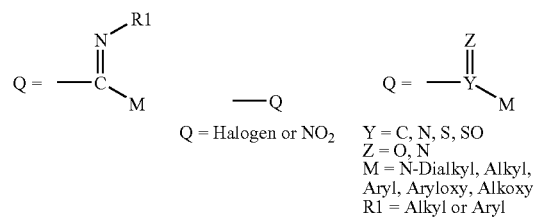

Specific and non-limiting examples of activated carbonates include bis(o-methoxycarbonylphenyl)carbonate, bis(o-chlorophenyl)carbonate, bis(o-nitrophenyl)carbonate, bis(o-acetylphenyl)carbonate, bis(o-phenylketonephenyl)carbonate, bis(o-formylphenyl)carbonate, and bis(o-cyanophenyl)carbonate. Unsymmetrical combinations of these structures, where the substitution number and type on A and A' are different, are also possible to employ in the current invention. A preferred structure for an activated carbonate is an ester-substituted diarylcarbonate having the structure:

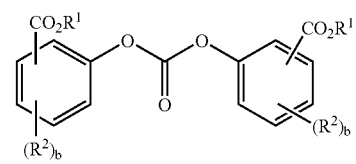

wherein $R^1$ is independently at each occurrence a $C_1$-$C_{20}$ alkyl radical, $C_4$-$C_{20}$ cycloalkyl radical, or $C_4$-$C_{20}$ aromatic radical; $R^2$ is independently at each occurrence a halogen atom, cyano group, nitro group, $C_1$-$C_{20}$ alkyl radical, $C_4$-$C_{20}$ cycloalkyl radical, $C_4$-$C_{20}$ aromatic radical, $C_1$-$C_{20}$ alkoxy radical, $C_4$-$C_{20}$ cycloalkoxy radical, $C_4$-$C_{20}$ aryloxy radical, $C_1$-$C_{20}$ alkylthio radical, $C_4$-$C_{20}$ cycloalkylthio radical, $C_4$-$C_{20}$ arylthio radical, $C_1$-$C_{20}$ alkylsulfinyl radical, $C_4$-$C_{20}$ cycloalkylsulfinyl radical, $C_4$-$C_{20}$ arylsulfinyl radical, $C_1$-$C_{20}$ alkylsulfonyl radical, $C_4$-$C_{20}$ cycloalkylsulfonyl radical, $C_4$-$C_{20}$ arylsulfonyl radical, $C_1$-$C_{20}$ alkoxycarbonyl radical, $C_4$-$C_{20}$ cycloalkoxycarbonyl radical, $C_4$-$C_{20}$ aryloxycarbonyl radical, $C_2$-$C_{60}$ alkylamino radical, $C_6$-$C_{60}$ cycloalkylamino radical, $C_5$-$C_{60}$ arylamino radical, $C_1$-$C_{40}$ alkylaminocarbonyl radical, $C_4$-$C_{40}$ cycloalkylaminocarbonyl radical, $C_4$-$C_{40}$ arylaminocarbonyl radical, or $C_1$-$C_{20}$ acylamino radical; and b is independently at each occurrence an integer 0-4.

At least one of the substituents $CO_2R^1$ is preferably attached in an ortho position relative to the carbonate group.

Examples of preferred ester-substituted diarylcarbonates include but are not limited to bis(methylsalicyl)carbonate (CAS Registry No. 82091-12-1), bis(ethyl salicyl)carbonate, bis(propyl salicyl)carbonate, bis(butylsalicyl)carbonate, bis(benzyl salicyl)carbonate, bis(methyl 4-chlorosalicyl)carbonate and the like. Typically BMSC is preferred for use in melt polycarbonate synthesis due to its lower molecular weight and higher vapor pressure.

One method for determining whether a certain diarylcarbonate is activated or is not activated is to carry out a model transesterification reaction between the certain diarylcarbonate with a phenol such as para-cumyl phenol. This phenol is preferred because it possesses only one reactive site, possesses a low of volatility and possesses a similar reactivity to bisphenol-A. The model transesterification reaction was carried out at temperatures above the melting points of the certain diarylcarbonate and para-cumyl phenol and in the presence of a transesterification catalyst, which is usually an aqueous solution of sodium hydroxide or sodium phenoxide. Preferred concentrations of the transesterification catalyst are about 0.001 mole % based on the number of moles of the phenol or diarylcarbonate. And a preferred reaction temperature is 200° C. But the choice of conditions and catalyst concentration can be adjusted depending on the reactivity of the reactants and melting points of the reactants to provide a convenient reaction rate. The only limitation to reaction temperature is that the temperature must be below the degradation temperature of the reactants. Sealed tubes can be used if the reaction temperatures cause the reactants to volatilize and affect the reactant molar balance. The determination of the equilibrium concentration of reactants is accomplished through reaction sampling during the course of the reaction and then analysis of the reaction mixture using a well-know detection method to those skilled in the art such as HPLC (high pressure liquid chromatography). Particular care needs to be taken so that reaction does not continue after the sample has been removed from the reaction vessel. This is accomplished by cooling down the sample in an ice bath and by employing a reaction quenching acid such as acetic acid in the water phase of the HPLC solvent system. It may also be desirable to introduce a reaction quenching acid directly into the reaction sample in addition to cooling the reaction mixture. A preferred concentration for the acetic acid in the water phase of the HPLC solvent system is 0.05% (v/v). The equilibrium constant can be determined from the concentration of the reactants and product when equilibrium is reached. Equilibrium is assumed to have been reached when the concentration of components in the reaction mixture reach a point of little or no change on sampling of the reaction mixture. The equilibrium constant can be determined from the concentration of the reactants and products at equilibrium by methods well known to those skilled in the art. A diarylcarbonate which possesses a relative equilibrium constant ($K_{test}/K_{DPC}$) of greater than 1 is considered to possess a more favorable equilibrium than diphenylcarbonate and is an activated carbonate, whereas a diarylcarbonate which possesses an equilibrium constant of 1 or less is considered to possess the same or a less favorable equilibrium than diphenylcarbonate and is considered not to be activated. It is generally preferred to employ an activated carbonate with very high reactivity compared to diphenylcarbonate when conducting transesterification reactions. Preferred are activated carbonates with an equilibrium constant greater than at least 10 times that of diarylcarbonate.

Some non-limiting examples of non-activating groups which, when present in an ortho position relative to the carbonate group, would not be expected to result in activated carbonates are alkyl, or cycolalkyl groups. Some specific and non-limiting examples of non-activated carbonates are bis(o-methylphenyl)carbonate, bis(p-cumylphenyl)carbonate, and bis(p-(1,1,3,3-tetramethyl)butylphenyl)carbonate. Unsymmetrical combinations of these structures are also expected to result in non-activated carbonates.

Unsymmetrical diarylcarbonates wherein one aryl group is activated and one aryl is unactivated or de-activated would also be useful in this invention if the activating group renders the diaryl carbonate still more reactive than diphenyl carbonate.

The carbonate may also be derived from dicarboxylic acids, dicarboxylic acid esters, or dicarboxylic acid halides. Such constituent repeating units are typically polyester-polycarbonate units. Non-limiting examples of dicarboxylic acids include terephthalic acid, isophthalic acid, sebacic acid, decanedioic acid, dodecanedioic acid, etc. Non-limiting examples of dicarboxylic acid esters include diphenyl sebacate, diphenyl terephthalate, diphenyl isophthalate, diphenyl decanedioate, diphenyl dodecanedioate, etc. Non-limiting examples of dicarboxylic acid halides include terephthaloyl chloride, isophthaloyl chloride, sebacoyl chloride, decanedioyl chloride, dodecanedioyl chloride, etc. Such polyester-polycarbonate units may be present in proportions of up to 50 mole %, preferably not more than 30 mole %, in copolymerized polycarbonates in accordance with the present invention.

The theoretical stoichiometry of the reaction within the equilibration vessel requires a molar ratio of dihydroxy compound to diaryl carbonate composition of 1:1. However, in practicing the present invention the molar ratio in the equilibration vessel is suitably between 0.25:1 to 3:1, more preferably 1:0.95 to 1:1.05 and more preferably 1:0.98 to 1:1.02.

The Dihydroxy:

The dihydroxy compound is not limited to aromatic dihydroxy compounds. However, such dihydroxy aromatic compounds are frequently preferred for use in these types of applications. It is contemplated that the dihydroxy compound comprises aliphatic diols and/or acids. The following is a non-limiting list of such compounds:

Aliphatic Diols:

Isosorbide: 1,4:3,6-dianhydro-D-sorbitol, Tricyclodecane-dimethanol (TCDDM), 4,8-Bis(hydroxymethyl)tricyclodecane, Tetramethylcyclobutanediol (TMCBD), 2,2,4,4,-tetramethylcyclobutane-1,3-diol, mixed isomers, cis/trans-1, 4-Cyclohexanedimethanol (CHDM), cis/trans-1,4-Bis (hydroxymethyl)cyclohexane, cyclohex-1,4-ylenedimethanol, trans-1,4-Cyclohexanedimethanol (tCHDM), trans-1,4-Bis(hydroxymethyl)cyclohexane, cis-1, 4-Cyclohexanedimethanol (cCHDM), cis-1,4-Bis(hydroxymethyl)cyclohexane, cis-1,2,-cyclohexanedimethanol, 1,1'-bi(cyclohexyl)-4,4'-diol, dicylcohexyl-4,4'-diol, 4,4'-dihydroxybicyclohexyl, and Poly(ethylene glycol).

Acids:

1,10-Dodecanedioic acid (DDDA), Adipic acid, Hexanedioic acid, Isophthalic acid, 1,3-Benzenedicarboxylic acid, Teraphthalic acid, 1,4-Benzenedicarboxylic acid, 2,6-Naphthalenedicarboxylic acid, 3-hydroxybenzoic acid (mHBA), and 4-hydroxybenzoic acid (pHBA).

It is further contemplated that the dihydroxy composition comprises a dihydroxy aromatic compound. A preferred dihydroxy aromatic composition of the present invention is bisphenol A (BPA). However, other dihydroxy aromatic compounds of the present invention can be used and are selected from the group consisting of bisphenols having structure,

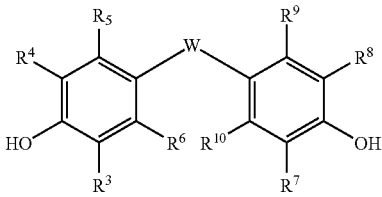

wherein $R^3$-$R^{10}$ are independently a hydrogen atom, halogen atom, nitro group, cyano group, $C_1$-$C_{20}$ alkyl radical, $C_4$-$C_{20}$ cycloalkyl radical, or $C_6$-$C_{20}$ C aryl radical; W is a bond, an oxygen atom, a sulfur atom, a $SO_2$ group, a $C_1$-$C_{20}$ aliphatic radical, a $C_6$-$C_{20}$ aromatic radical, a $C_6$-$C_{20}$ cycloaliphatic radical, or the group

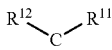

wherein $R^{11}$ and $R^{12}$ are independently a hydrogen atom, $C_1$-$C_{20}$ alkyl radical, $C_4$-$C_{20}$ cycloalkyl radical, or $C_4$-$C_{20}$ aryl radical; or $R^{11}$ and $R^{12}$ together form a $C_4$-$C_{20}$ cycloaliphatic ring which is optionally substituted by one or more $C_1$-$C_{20}$ alkyl, $C_6$-$C_{20}$ aryl, $C_5$-$C_{21}$ aralkyl, $C_5$-$C_{20}$ cycloalkyl groups, or a combination thereof; dihydroxy benzenes having structure

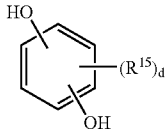

wherein $R^{15}$ is independently at each occurrence a hydrogen atom, halogen atom, nitro group, cyano group, $C_1$-$C_{20}$ alkyl radical, $C_4$-$C_{20}$ cycloalkyl radical, or $C_4$-$C_{20}$ aryl radical, d is an integer from 0 to 4; and dihydroxy naphthalenes having structures,

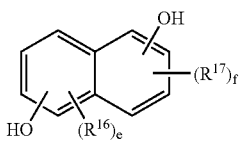

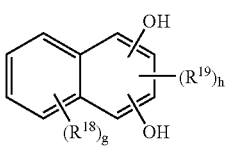

wherein $R^{16}$, $R^{17}$, $R^{18}$ and $R^{19}$ are independently at each occurrence a hydrogen atom, halogen atom, nitro group, cyano group, $C_1$-$C_{20}$ alkyl radical, $C_4$-$C_{20}$ cycloalkyl radical, or $C_4$-$C_{20}$ aryl radical; e and f are integers from 0 to 3, g is an integer from 0 to 4, and h is an integer from 0 to 2.

Suitable bisphenols are illustrated by 2,2-bis(4-hydroxyphenyl)propane (bisphenol A); 2,2-bis(3-chloro-4-hydroxyphenyl)propane; 2,2-bis(3-bromo-4-hydroxyphenyl)propane; 2,2-bis(4-hydroxy-3-methylphenyl)propane; 2,2-bis(4-hydroxy-3-isopropylphenyl)propane; 2,2-bis(3-t-butyl-4-hydroxyphenyl)propane; 2,2-bis(3-phenyl-4-hydroxyphenyl)propane; 2,2-bis(3,5-dichloro-4-hydroxyphenyl)-propane; 2,2-bis(3,5-dibromo-4-hydroxyphenyl)propane; 2,2-bis(3,5-dimethyl-4-hydroxyphenyl)propane; 2,2-bis(3-chloro-4-hydroxy-5-methylphenyl)propane; 2,2-bis(3-bromo-4-hydroxy-5-methylphenyl)propane; 2,2-bis(3-chloro-4-hydroxy-5-isopropylphenyl)propane; 2,2-bis(3-bromo-4-hydroxy-5-isopropylphenyl)propane; 2,2-bis(3-t-butyl-5-chloro-4-hydroxyphenyl)propane; 2,2-bis(3-bromo-5-t-butyl-4-hydroxyphenyl)propane; 2,2-bis(3-chloro-5-phenyl-4-hydroxyphenyl)propane; 2,2-bis(3-bromo-5-phenyl-4-hydroxyphenyl)propane; 2,2-bis(3,5-disopropyl-4-hydroxyphenyl)propane; 2,2-bis(3,5-di-t-butyl-4-hydroxyphenyl)propane; 2,2-bis(3,5-diphenyl-4-hydroxyphenyl)propane; 2,2-bis(4-hydroxy-2,3,5,6-tetrachlorophenyl)propane; 2,2-bis(4-hydroxy-2,3,5,6-tetrabromophenyl)propane; 2,2-bis(4-hydroxy-2,3,5,6-tetramethylphenyl)propane; 2,2-bis(2,6-dichloro-3,5-dimethyl-4-hydroxyphenyl)propane; 2,2-bis(2,6-dibromo-3,5-dimethyl-4-hydroxyphenyl)propane; 1,1-bis(4-hydroxyphenyl)cyclohexane; 1,1-bis(3-chloro-4-hydroxyphenyl)cyclohexane; 1,1-bis(3-bromo-4-hydroxyphenyl)cyclohexane; 1,1-bis(4-hydroxy-3-methylphenyl)cyclohexane; 1,1-bis(4-hydroxy-3-isopropylphenyl)cyclohexane; 1,1-bis(3-t-butyl-4-hydroxyphenyl)cyclohexane; 1,1-bis(3-phenyl-4-hydroxyphenyl)cyclohexane; 1,1-bis(3,5-dichloro-4-hydroxyphenyl)cyclohexane; 1,1-bis(3,5-dibromo-4-hydroxyphenyl)cyclohexane; 1,1-bis(3,5-dimethyl-4-hydroxyphenyl)cyclohexane; 1,1-bis(3-chloro-4-hydroxy-5-methylphenyl)cyclohexane; 1,1-bis(3-bromo-4-hydroxy-5-methylphenyl)cyclohexane; 1,1-bis(3-chloro-4-hydroxy-5-isopropylphenyl)cyclohexane; 1,1-bis(3-bromo-4-hydroxy-5-isopropylphenyl)cyclohexane; 1,1-bis(3-t-butyl-5-chloro-4-hydroxyphenyl)cyclohexane; 1,1-bis(3-bromo-5-t-butyl-4-hydroxyphenyl)cyclohexane; 1,1-bis(3-chloro-5-phenyl-4-hydroxyphenyl)cyclohexane; 1,1-bis(3-bromo-5-phenyl-4-hydroxyphenyl)cyclohexane; 1,1-bis(3,5-disopropyl-4-hydroxyphenyl)cyclohexane; 1,1-bis(3,5-di-t-butyl-4-hydroxyphenyl)cyclohexane; 1,1-bis(3,5-diphenyl-4-hydroxyphenyl)cyclohexane; 1,1-bis(4-hydroxy-2,3,5,6-tetrachlorophenyl)cyclohexane; 1,1-bis(4-hydroxy-2,3,5,6-tetrabromophenyl)cyclohexane; 1,1-bis(4-hydroxy-2,3,5,6-tetramethylphenyl)cyclohexane; 1,1-bis(2,6-dichloro-3,5-dimethyl-4-hydroxyphenyl)cyclohexane; 1,1-bis(2,6-dibromo-3,5-dimethyl-4-hydroxyphenyl)cyclohexane; 1,1-bis(4-hydroxyphenyl)-3,3,5-trimethylcyclohexane; 1,1-bis(3-chloro-4-hydroxyphenyl)-3,3,5-trimethylcyclohexane; 1,1-bis(3-bromo-4-hydroxyphenyl)-3,3,5-trimethylcyclohexane; 1,1-bis(4-hydroxy-3-methylphenyl)-3,3,5-trimethylcyclohexane; 1,1-bis(4-hydroxy-3-isopropylphenyl)-3,3,5-trimethylcyclohexane; 1,1-bis(3-t-butyl-4-hydroxyphenyl)-3,3,5-trimethylcyclohexane; 1,1-bis(3-phenyl-4-hydroxyphenyl)-3,3,5-trimethylcyclohexane; 1,1-bis(3,5-dichloro-4-hydroxyphenyl)-3,3,5-trimethylcyclohexane; 1,1-bis(3,5-dibromo-4-hydroxyphenyl)-3,3,5-trimethylcyclohexane; 1,1-bis(3,5-dimethyl-4-hydroxyphenyl)-3,3,5-trimethylcyclohexane;

1,1-bis(3-chloro-4-hydroxy-5-methylphenyl)-3,3,5-trimethylcyclohexane; 1,1-bis(3-bromo-4-hydroxy-5-methylphenyl)-3,3,5-trimethylcyclohexane; 1,1-bis(3-chloro-4-hydroxy-5-isopropylphenyl)-3,3,5-trimethylcyclohexane; 1,1-bis(3-bromo-4-hydroxy-5-isopropylphenyl)-3,3,5-trimethylcyclohexane; 1,1-bis(3-t-butyl-5-chloro-4-hydroxyphenyl)-3,3,5-trimethylcyclohexane; 1,1-bis(3-bromo-5-t-butyl-4-hydroxyphenyl)-3,3,5-trimethylcyclohexane; bis(3-chloro-5-phenyl-4-hydroxyphenyl)-3,3,5-trimethylcyclohexane; 1,1-bis(3-bromo-5-phenyl-4-hydroxyphenyl)-3,3,5-trimethylcyclohexane; 1,1-bis(3,5-disopropyl-4-hydroxyphenyl)-3,3,5-trimethylcyclohexane; 1,1-bis(3,5-di-t-butyl-4-hydroxyphenyl)-3,3,5-trimethylcyclohexane; 1,1-bis(3,5-diphenyl-4-hydroxyphenyl)-3,3,5-trimethylcyclohexane; 1,1-bis(4-hydroxy-2,3,5,6-tetrachlorophenyl)-3,3,5-trimethylcyclohexane; 1,1-bis(4-hydroxy-2,3,5,6-tetrabromophenyl)-3,3,5-trimethylcyclohexane; 1,1-bis(4-hydroxy-2,3,5,6-tetramethylphenyl)-3,3,5-trimethylcyclohexane; 1,1-bis(2,6-dichloro-3,5-dimethyl-4-hydroxyphenyl)-3,3,5-trimethylcyclohexane; 1,1-bis(2,6-dibromo-3,5-dimethyl-4-hydroxyphenyl)-3,3,5-trimethylcyclohexane; 4,4'dihydroxy-1,1-biphenyl; 4,4'-dihydroxy-3,3'-dimethyl-1,1-biphenyl; 4,4'-dihydroxy-3,3'-dioctyl-1,1-biphenyl; 4,4'-dihydroxydiphenylether; 4,4'-dihydroxydiphenylthioether; 1,3-bis(2-(4-hydroxyphenyl)-2-propyl)benzene; 1,3-bis(2-(4-hydroxy-3-methylphenyl)-2-propyl)benzene; 1,4-bis(2-(4-hydroxyphenyl)-2-propyl)benzene, and 1,4-bis(2-(4-hydroxy-3-methylphenyl)-2-propyl)benzene.

Suitable dihydroxy benzenes are illustrated by hydroquinone, resorcinol, methylhydroquinone, butylhydroquinone, phenylhydroquinone, 4-phenylresorcinol and 4-methylresorcinol.

Suitable dihydroxy naphthalenes are illustrated by 2,6-dihydroxy naphthalene; 2,6-dihydroxy-3-methyl naphthalene; and 2,6-dihydroxy-3-phenyl naphthalene.

Suitable dihydroxy naphthalenes are illustrated by 1,4-dihydroxy naphthalene; 1,4-dihydroxy-2-methyl naphthalene; 1,4-dihydroxy-2-phenyl naphthalene and 1,3-dihydroxy naphthalene.

The relative amounts of BPA and other comonomers are selected based on the desired composition of the oligomers and the resulting polycarbonate. If other comonomers are used, they can be added as part of the same feed, in a separate feed, or both.

The Activated Carbonate Residue:

The reaction components of the present invention comprise a dihydroxy compound (which may optionally include a polycarbonate oligomer as described above), an activated carbonate residue, and a transesterification catalyst. The activated carbonate residue may be a single activated carbonate residue or a mixture activated carbonate residues and other solvents. Typically the activated carbonate residue present in the solution of the oligomeric polycarbonate comprises from 1 percent by weight to 99 percent by weight, preferably from 1 percent by weight to 70 percent by weight of the mixture. For example a solution of oligomeric bisphenol A polycarbonate dissolved in methyl salicylate is 40 percent by weight of the oligomeric polycarbonate and 60 percent by weight methyl salicylate.

In one embodiment of the present invention the activated carbonate residue is at least one ester-substituted phenol having the structure,

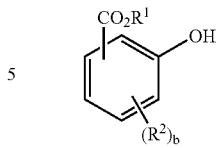

wherein $R^1$ is a $C_1$-$C_{20}$ alkyl group, $C_4$-$C_{20}$ cycloalkyl group, or $C_4$-$C_{20}$ aryl group; $R^2$ is independently at each occurrence a halogen atom, cyano group, nitro group, $C_1$-$C_{20}$ alkyl group, $C_4$-$C_{20}$ cycloalkyl group, $C_4$-$C_{20}$ aryl group, $C_1$-$C_{20}$ alkoxy group, $C_4$-$C_{20}$ cycloalkoxy group, $C_4$-$C_{20}$ aryloxy group, $C_1$-$C_{20}$ alkylthio group, $C_4$-$C_{20}$ cycloalkylthio group, $C_4$-$C_{20}$ arylthio group, $C_1$-$C_{20}$ alkylsulfinyl group, $C_4$-$C_{20}$ cycloalkylsulfinyl group, $C_4$-$C_{20}$ arylsulfinyl group, $C_1$-$C_{20}$ alkylsulfonyl group, $C_4$-$C_{20}$ cycloalkylsulfonyl group, $C_4$-$C_{20}$ arylsulfonyl group, $C_1$-$C_{20}$ alkoxycarbonyl group, $C_4$-$C_{20}$ cycloalkoxycarbonyl group, $C_4$-$C_{20}$ aryloxycarbonyl group, $C_2$-$C_{60}$ alkylamino group, $C_6$-$C_{60}$ cycloalkylamino group, $C_5$-$C_{60}$ arylamino group, $C_1$-$C_{40}$ alkylaminocarbonyl group, $C_4$-$C_{40}$ cycloalkylaminocarbonyl group, $C_4$-$C_{40}$ arylaminocarbonyl group, or $C_1$-$C_{20}$ acylamino group; and b is an integer 0-4.

Examples of ester-substituted phenols (i.e. activated carbonate residues) include methyl salicylate, ethyl salicylate, propyl salicylate, butyl salicylate, 4-chloro methyl salicylate, benzyl salicylate and mixtures thereof. Typically, methyl salicylate is preferred. Further the solvent may be recovered and reused. For example, ester-substituted phenols such as methyl salicylate may be recovered, purified, and reacted with phosgene to make ester-substituted diaryl carbonates which in turn can be used to prepare oligomeric polycarbonates. Typically, purification of the recovered ester-substituted phenol is efficiently carried out by distillation.

The Catalyst:

A typical catalyst system used in accordance with the method of the present invention is an alpha/beta catalyst system comprising a base, and preferably comprises at least one source of alkaline earth ions or alkali metal ions, and/or at least one quaternary ammonium compound, a quaternary phosphonium compound or a mixture thereof. The alpha source of alkaline earth ions or alkali metal ions being used is in an amount such that the amount of alkaline earth or alkali metal ions present in the reaction mixture is in a range between $10^{-5}$ and $10^{-8}$ moles alkaline earth or alkali metal ion per mole of dihydroxy compound employed.

The beta catalyst is quaternary phosphonium and/or quaternary ammonium compound. The quaternary ammonium is selected from the group of organic ammonium compounds having structure,

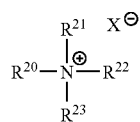

wherein $R^{20}$-$R^{23}$ are independently a $C_1$-$C_{20}$ alkyl radical, $C_4$-$C_{20}$ cycloalkyl radical, or a $C_4$-$C_{20}$ aryl radical; and $X^-$ is an organic or inorganic anion. In one embodiment of the present invention anion $X^-$ is selected from the group consisting of hydroxide, halide, carboxylate, sulfonate, sulfate, formate, carbonate, and bicarbonate.

Non-limiting examples of suitable organic quaternary ammonium compounds are tetramethyl ammonium hydroxide, tetrabutyl ammonium hydroxide, tetramethyl ammonium acetate, tetramethyl ammonium formate and tetrabutyl ammonium acetate. Tetramethyl ammonium hydroxide is often preferred.

The quaternary phosphonium compound is selected from the group of organic phosphonium compounds having structure,

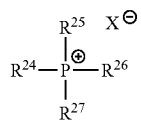

wherein $R^{24}$-$R^{27}$ are independently a $C^1$-$C^{20}$ alkyl radical, $C^4$-$C^{20}$ cycloalkyl radical, or a $C_4$-$C_{20}$ aryl radical; and $X^-$ an organic or inorganic anion. In one embodiment of the present invention anion $X^-$ an anion selected from the group consisting of hydroxide, halide, carboxylate, sulfonate, sulfate, formate, carbonate, and bicarbonate. Suitable organic quaternary phosphonium compounds are illustrated by tetramethyl phosphonium hydroxide, tetramethyl phosphonium acetate, tetramethyl phosphonium formate, tetrabutyl phosphonium hydroxide, and tetrabutyl phosphonium acetate (TBPA). TBPA is often preferred.

Where $X^-$ a polyvalent anion such as carbonate or sulfate it is understood that the positive and negative charges in the quaternary ammonium and phosphonium structures are properly balanced. For example, where $R^{20}$-$R^{23}$ are each methyl groups and $X^-$ carbonate, it is understood that $X^-$ represents ½ ($CO_3^{-2}$).

Suitable sources of alkaline earth ions include alkaline earth hydroxides such as magnesium hydroxide and calcium hydroxide. Suitable sources of alkali metal ions include the alkali metal hydroxides illustrated by lithium hydroxide, sodium hydroxide and potassium hydroxide. Other sources of alkaline earth and alkali metal ions include salts of carboxylic acids, such as sodium acetate and derivatives of ethylene diamine tetraacetic acid (EDTA) such as EDTA tetrasodium salt, and EDTA magnesium disodium salt. Sodium hydroxide is often preferred.

The amount of catalyst employed is typically based upon the total number of moles of dihydroxy compound employed in the polymerization reaction. When referring to the ratio of catalyst, for example phosphonium salt, to all dihydroxy compounds employed in the polymerization reaction, it is convenient to refer to moles of phosphonium salt per mole of the dihydroxy compound(s), meaning the number of moles of phosphonium salt divided by the sum of the moles of each individual dihydroxy compound present in the reaction mixture. The amount of organic ammonium or phosphonium salts employed typically will be in a range between $1\times10^{-2}$ and $1\times10^{-5}$, preferably between $1\times10^{-3}$ and $1\times10^{-4}$ moles per mole of the first and second dihydroxy compounds combined. The inorganic metal hydroxide catalyst typically will be used in an amount corresponding to between $1\times10^{-4}$ and $1\times10^{-8}$, preferably $1\times10^{-4}$ and $1\times10^{-7}$ moles of metal hydroxide per mole of the first and second dihydroxy compounds combined.

In a third catalyst system according to the method of the present invention, solely an alkali metal hydroxide may be employed. As discussed above, alkali metal hydroxides are illustrated by sodium hydroxide, lithium hydroxide, and potassium hydroxide. Due to its relatively low cost, sodium hydroxide is often preferred.

EXAMPLES

The following examples are set forth to provide those of ordinary skill in the art with a detailed description of how the methods claimed herein are used, and are not intended to limit the scope of what the inventors regard as their invention. Unless indicated otherwise, parts are by weight, temperature is in ° C.

Example Overview and Conditions

An oligomeric polycarbonate mixture was prepared by the oligomerization of bis phenol A (BPA) and bis-methyl salicyl carbonate (BMSC) in a stirred reactor with a molar ratio of 1.02 (BMSC/BPA) at a temperature of 170° C. Before heating up the reactor 25 micro equivalents of TMAH and 4 micro equivalents of NaOH was added to the reactor. The pressure in the reactor during oligomerization is 800 mbar. After 4 hours of oligomerization the oligomer had reached equilibrium and contained 55% methyl salicylate (MS). Then the temperature of the reactor was increased to 200° C. and the pressure reduced to 300 mbar. At these conditions MS was removed until the content MS in the reactor was 15%.

Figure 5:
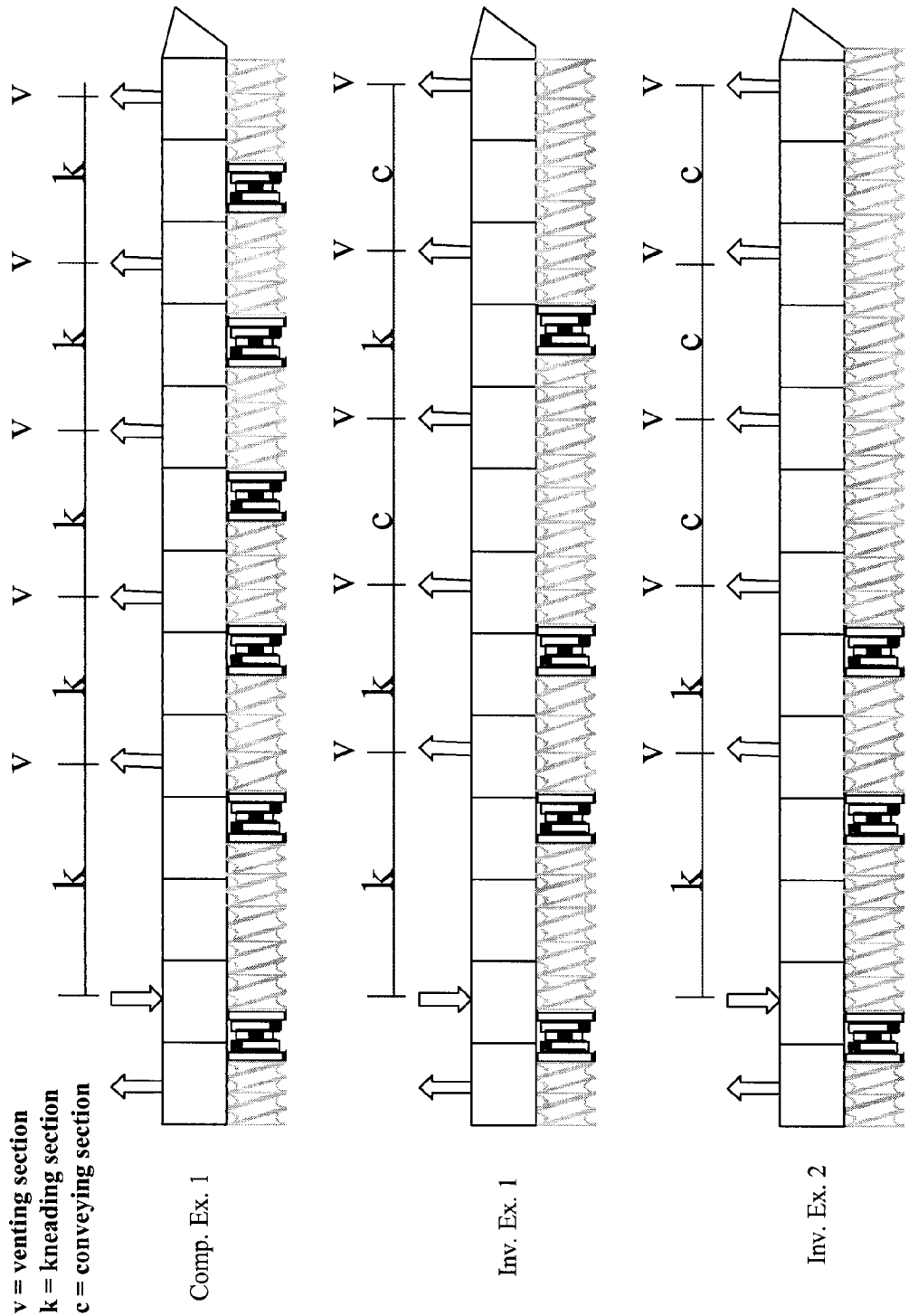
FIG. 5 shows side views of extruders used in the examples section below.

The prepared oligomeric polycarbonate mixture was pumped a 25 mm twin-screw extruder (as depicted in FIG. 5) with an L/D of 59. The oligomer was injected in the second barrel of the extruder. There was a ventport on the first barrel of the extruder (i.e. a backvent) and there was 5 ventports downstream of the injection point starting with forward vent 1 (a.k.a FV 1) closest to the feed port and ending at forward vent 5 (a.k.a. FV 5) located immediately prior to the polycarbonate exit port of the extruder. The extruder had two vacuum systems called Lo-vac system and hi-vac system. The backvent and FV 1 were connected to the lo-vac system. FVs 2-5 were connected to the hi-vac system.

In these experiments three different screw designs were evaluated. These screw designs were coded Comparative Example 1, Invention Example 1, and Invention Example 2. The screw design in Comparative Example 1, as illustrated in FIG. 5, had a kneading section between the injection point of the reaction components and FV 1. After FV1 there was a kneading section between all of FV 2-FV 5 ventports. The kneading section between FV 1 and FV 2 consisted of two 3-lobe kneading elements, a ZME-element and a left-handed conveying element. The kneading sections between the other ventports consisted of a ZME element and a left-handed kneading element.

In the screw design of Invention Example 1 the kneading sections between FV 2 and FV 3 and between FV 4 and FV 5 were removed and replaced by conveying sections having screw element configurations consisting of one or more conveying elements and no kneading elements. In the screw design of Invention Example 2, in addition to the replacement of the kneading section with the conveying sections of Invention Example 1, the kneading section between FV 3 and FV 4 was removed and also replaced with a conveying section. In other words, from FV 2 to the polycarbonate exit section, the screw design of Invention Example 2, only consists of conveying elements with venting sections along the extruder. See FIG. 5.

For each screw design described above samples were collected at 10 different conditions on the extruder. Each condition was a combination of screwspeed and polymer rate. The screwspeed varied from 300 rpm to 600 rpm. The polymer rate was determined by using fixed ratios of polymer rate divided by screwspeed. Three different ratios were used: low=0.024, medium=0.03 and high=0.036 (the terms low, medium, and high only describe the values of the examples of the present invention). Table 1 shows an overview of the polymer rate and screwspeed for each condition. Table 2 shows an overview of the vacuum pressures at the backvent (BV), and the forward vents (FVs 1-5).

Discussion:

Comparative Example 1 illustrates an extruder having kneading section between each ventport. This section is designed in such a way that there is a melt seal between each ventport. The function of the kneading section is to prevent the vacuum pressures at the different ventports from influencing each other and it promotes the surface renewal for effective devolatilization of the MS. It has been found, that a disadvantage of this approach is that at each of the kneading

TABLE 1

Overview of polymer rate and screwspeed for each condition

| | Condition | | | | | | | | | |
|---|---|---|---|---|---|---|---|---|---|---|
| | 1 | 2 | 3 | 4 | 5 | 6 | 7 | 8 | 9 | 10 |
| Screwspeed (rpm) | 300 | 300 | 400 | 400 | 400 | 500 | 500 | 500 | 600 | 600 |
| Polymer rate (kg/hr) | 8.7 | 10.6 | 9.6 | 11.9 | 14.3 | 11.7 | 14.8 | 18.1 | 14.2 | 17.9 |
| rate/screw speed | medium | high | low | medium | high | low | medium | high | low | medium |

TABLE 2

Overview example vent pressures

| | | Condition | | | | | | | | | |
|---|---|---|---|---|---|---|---|---|---|---|---|
| | | 1 | 2 | 3 | 4 | 5 | 6 | 7 | 8 | 9 | 10 |
| | Screwspeed (rpm) | 300 | 300 | 400 | 400 | 400 | 500 | 500 | 500 | 600 | 600 |
| | Polymer rate (kg/hr) | 8.7 | 10.6 | 9.6 | 11.9 | 14.3 | 11.7 | 14.8 | 18.1 | 14.2 | 17.9 |
| BV (mbar) | Comp. Ex. 1 | 3.5 | 4.1 | 3.9 | 4.1 | 4.9 | 4.2 | 5 | 6 | 5 | 5.4 |
| | Inv. Ex. 1 | 4.2 | 4.1 | 4 | 4.7 | 5.2 | 4.8 | 5.7 | 6.3 | 5.4 | 6.2 |
| | Inv. Ex. 2 | 3.8 | 4.4 | 4 | 4.5 | 5.7 | 4.8 | 6 | 7.9 | 5.8 | 7 |
| FV 1 (mbar) | Comp. Ex. 1 | 1.1 | 2 | 1.8 | 1.9 | 1.2 | 2.1 | 2.5 | 3.2 | 2.5 | 3 |
| | Inv. Ex. 1 | 3.2 | 2.1 | 2.1 | 2.4 | 2.5 | 2.4 | 2.7 | 3.1 | 2.5 | 3 |
| | Inv. Ex. 2 | 2.1 | 2 | 2 | 2.1 | 2.2 | 2.2 | 2.4 | 2.8 | 2.3 | 2.8 |
| FV 2-5 (mbar) | Comp. Ex. 1 | 0.4 | 0.6 | 0.6 | 0.6 | 0.4 | 0.6 | 0.7 | 0.9 | 0.7 | 0.9 |
| | Inv. Ex. 1 | 2.1 | 1.7 | 1.6 | 1.7 | 1.7 | 1.7 | 1.8 | 1.9 | 1.7 | 1.8 |
| | Inv. Ex. 2 | 1.5 | 1.5 | 1.5 | 1.5 | 1.5 | 1.6 | 1.6 | 1.7 | 1.6 | 1.7 |

Results:

Molecular weights were determined by GPC analysis of solutions of 1 mg/ml of the polymers dissolved in di-chloromethane. All the molecular weight results are given as values relative to polycarbonate.

The free methyl salicylate in the polymers was measured by means of HPLC. The final resin was dissolved in di-chloromethane. The polymer was precipitated by adding methanol and separated from the mixture. The amount of methyl salicylate is reported in ppm. Table 3 shows the residual methyl salicylate in the extruded polycarbonate product.

sections, the barrel is completely filled with polymer. When the extruder is filled with polymer, devolatilization will be limited and the removal of the MS will be hindered.

As shown in Invention Examples 1 and 2, by replacing two of the kneading sections of the extruder of Comparative Example 1 with conveying sections having of one or more conveying elements, the resulting extruded product polycarbonate shows a substantial improvement in the content of residual MS for all tested extruder conditions.

By removing yet another kneading section, as demonstrated in the screw design of Invention Example 2, the resulting extruded product polycarbonate shows that the content of residual MS is increased as compared to the screw design in

TABLE 3

Residual MS in polycarbonate product

| | | Condition | | | | | | | | | |
|---|---|---|---|---|---|---|---|---|---|---|---|
| | | 1 | 2 | 3 | 4 | 5 | 6 | 7 | 8 | 9 | 10 |
| | Screwspeed (rpm) | 300 | 300 | 400 | 400 | 400 | 500 | 500 | 500 | 600 | 600 |
| | Polymer rate (kg/hr) | 8.7 | 10.6 | 9.6 | 11.9 | 14.3 | 11.7 | 14.8 | 18.1 | 14.2 | 17.9 |
| Residual MS (ppm) | Comp. Ex. 1 | 341 | 582 | 229 | 479 | 915 | 292 | 661 | 1448 | 739 | 1011 |
| | Inv. Ex. 1 | 186 | 308 | 133 | 238 | 443 | 153 | 322 | 612 | 203 | 431 |
| | Inv. Ex. 2 | 281 | 409 | 207 | 350 | 568 | 252 | 469 | 732 | 314 | 557 |

Invention Example 1, but that it is still lower when compared to the screw design of Comparative Example 1.

The invention claimed is:

1. A method for preparing polycarbonate wherein the method comprises the steps of,
   (i) introducing to an extruder through one or more feed sections, a plurality of reaction components comprising an activated carbonate, a dihydroxy compound, an activated carbonate residue, and a transesterification catalyst, wherein the extruder comprises: (a) a first feed section; (b) a polycarbonate exit section; and (c) a reaction section, disposed between the first feed section and the polycarbonate exit section, the reaction section comprising at least one conveying section having a screw element configuration consisting of one or more conveying elements, a plurality of kneading sections wherein each kneading section has a screw element configuration comprising a kneading element, and a plurality of venting sections, wherein:
      a venting section is disposed between each of the plurality kneading sections and the conveying section and a final venting section is disposed between the final kneading section and the polycarbonate exit section, and
      the plurality of kneading sections and the plurality of venting sections are selected such that the number of venting sections minus the number of kneading sections is greater than or equal to one, and
   (ii) extruding the plurality of reaction components at a temperature in a range between 100° C. and 500° C., wherein during the extrusion of the reaction components, activated carbonate residue is removed through the plurality of venting sections, and polycarbonate is removed through the polycarbonate exit section.

2. The method of claim 1, wherein the conveying section, the plurality of kneading sections, and the plurality of venting sections, are arranged in a configuration selected from the group consisting of:

KV (KVCV)$_n$, (1)

(KV)$_p$ (CV)$_m$, and (2)

(KV)$_q$ (CV)$_r$ (KV)$_s$ (3)

wherein K is a kneading section, V is a venting section, and C is a conveying section; n is 1, 2, or 3; p is 1, 2, or 3; m is 2, 3, or 4; q is 1, 2, or 3; r is 1 or 2; and s is 1 or 2.

3. The method of claim 1, wherein the conveying section, the plurality of kneading sections, and the plurality of venting sections, are arranged in the following configuration:

KV (KVCV)$_n$, wherein K is a kneading section; V is a venting section; C is a conveying section; and n is 1, 2, or 3.

4. The method of claim 3, wherein n is 2.

5. The method of claim 1, wherein the conveying section, the plurality of kneading sections, and the plurality of venting sections, are arranged in the following configuration:

(KV)$_p$ (CV)$_m$, wherein K is a kneading section; V is a venting section; C is a conveying section; p is 1, 2, or 3; and m is 2, 3, or 4.

6. The method of claim 5, wherein p is 2 and m is 3.

7. The method of claim 1, wherein the conveying section, the plurality of kneading sections, and the plurality of venting sections, are arranged in the following configuration:

(KV)$_q$ (CV)$_r$ (KV)$_s$ wherein K is a kneading section; V is a venting section; C is a conveying section; q is 1, 2, or 3; r is 1 or 2; and s is 1 or 2.

8. The method of claim 7, wherein q is 2, r is 1, and s is 1.

9. The method of claim 1, wherein the activated carbonate residue comprises an ester-substituted phenol having structure I,

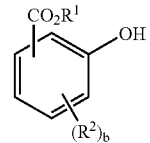

wherein $R^1$ is a $C_1$-$C_{20}$ alkyl group, $C_4$-$C_{20}$ cycloalkyl group, or $C_4$-$C_{20}$ aryl group; $R^2$ is independently at each occurrence a halogen atom, cyano group, nitro group, $C_1$-$C_{20}$ alkyl group, $C_4$-$C_{20}$ cycloalkyl group, $C_4$-$C_{20}$ aryl group, $C_1$-$C_{20}$ alkoxy group, $C_4$-$C_{20}$ cycloalkoxy group, $C_4$-$C_{20}$ aryloxy group, $C_1$-$C_{20}$ alkylthio group, $C_4$-$C_{20}$ cycloalkylthio group, $C_4$-$C_{20}$ arylthio group, $C_1$-$C_{20}$ alkylsulfinyl group, $C_4$-$C_{20}$ cycloalkylsulfinyl group, $C_4$-$C_{20}$ arylsulfinyl group, $C_1$-$C_{20}$ alkylsulfonyl group, $C_4$-$C_{20}$ cycloalkylsulfonyl group, $C_4$-$C_{20}$ arylsulfonyl group, $C_1$-$C_{20}$ alkoxycarbonyl group, $C_4$-$C_{20}$ cycloalkoxycarbonyl group, $C_4$-$C_{20}$ aryloxycarbonyl group, $C_2$-$C_{60}$ alkylamino group, $C_6$-$C_{60}$ cycloalkylamino group, $C_5$-$C_{60}$ arylamino group, $C_1$-$C_{40}$ alkylaminocarbonyl group, $C_4$-$C_{40}$ cycloalkylaminocarbonyl group, $C_4$-$C_{40}$ arylaminocarbonyl group, or $C_1$-$C_{20}$ acylamino group; and b is an integer 0-4.

10. The method of claim 9, wherein the ester-substituted phenol is selected from the group consisting of phenyl salicylate, methyl salicylate, ethyl salicylate, isopropyl salicylate and benzyl salicylate.

11. The method of claim 1, wherein the extruder further comprises a back venting section, wherein the first feed section is disposed between the back venting section and the polycarbonate exit section and wherein during the extrusion of the reaction components, activated carbonate residue is removed through the back venting section.

12. The method of claim 1, wherein the plurality of venting sections are operated at or below atmospheric pressure.

13. The method of claim 1, wherein the polycarbonate comprises polycarbonate repeat units derived from more than one dihydroxy compound.

14. The method of claim 1, wherein the extruder has a screw speed, the reaction components being introduced into the extruder at a feed rate, the feed rate and the screw speed having a ratio, the extruder being operated such that the ratio of feed rate in kilograms per hour to the screw speed expressed in revolutions per minute falls within a range of from 0.01 to 100.

15. The method of claim 1, wherein the extruder is a double screw extruder or a multiple screw extruder.

16. The method of claim 1, wherein prior to introducing the plurality of reaction components to the extruder through the one or more feed sections, the method further comprises the steps of:
   forming a reaction mixture comprising the plurality of reaction components, and
   heating the reaction mixture at a temperature in a range between 100° C. and 500° C. to provide the plurality of reaction components, wherein the plurality of reaction components further comprise a polycarbonate oligomer.

17. The method of claim 1, wherein the extruder comprises a plurality of feed sections wherein the plurality of reaction components are introduced to the extruder either individually through separate feed sections or in any combination in any feed section.

18. A method for preparing polycarbonate wherein the method comprises the steps of,
(i) forming a reaction mixture comprising a dihydroxy compound, an activated carbonate, and a transesterification catalyst, and
(ii) heating the reaction mixture at a temperature in a range between 100° C. and 500° C. to provide a plurality of reaction components comprising a polycarbonate oligomer, a dihydroxy compound, a transesterification catalyst, and an ester-substituted phenol having structure I,

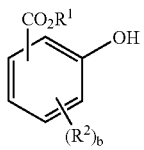

I wherein $R^1$ is a $C_1$-$C_{20}$ alkyl group, $C_4$-$C_{20}$ cycloalkyl group, or $C_4$-$C_{20}$ aryl group; $R^2$ is independently at each occurrence a halogen atom, cyano group, nitro group, $C_1$-$C_{20}$ alkyl group, $C_4$-$C_{20}$ cycloalkyl group, $C_4$-$C_{20}$ aryl group, $C_1$-$C_{20}$ alkoxy group, $C_4$-$C_{20}$ cycloalkoxy group, $C_4$-$C_{20}$ aryloxy group, $C_1$-$C_{20}$ alkylthio group, $C_4$-$C_{20}$ cycloalkylthio group, $C_4$-$C_{20}$ arylthio group, $C_1$-$C_{20}$ alkylsulfinyl group, $C_4$-$C_{20}$ cycloalkylsulfinyl group, $C_4$-$C_{20}$ arylsulfinyl group, $C_1$-$C_{20}$ alkylsulfonyl group, $C_4$-$C_{20}$ cycloalkylsulfonyl group, $C_4$-$C_{20}$ arylsulfonyl group, $C_1$-$C_{20}$ alkoxycarbonyl group, $C_4$-$C_{20}$ cycloalkoxycarbonyl group, $C_4$-$C_{20}$ aryloxycarbonyl group, $C_2$-$C_{60}$ alkylamino group, $C_6$-$C_{60}$ cycloalkylamino group, $C_5$-$C_{60}$ arylamino group, $C_1$-$C_{40}$ alkylaminocarbonyl group, $C_4$-$C_{40}$ cycloalkylaminocarbonyl group, $C_4$-$C_{40}$ arylaminocarbonyl group, or $C_1$-$C_{20}$ acylamino group; and b is an integer 0-4,
(iii) introducing to an extruder through one or more feed sections, the plurality of reaction components,
wherein the extruder comprises: (a) a first feed section; (b) a polycarbonate exit section; and (c) a reaction section, disposed between the first feed section and the polycarbonate exit section, the reaction section comprising a conveying section having a screw element configuration consisting of one or more conveying elements, a plurality of kneading sections wherein each kneading section has a screw element configuration comprising a kneading element, and a plurality of venting sections, wherein:
a venting section is disposed between each of the plurality kneading sections and the conveying section and a final venting section is disposed between the final kneading section and the polycarbonate exit section, and
the plurality of kneading sections and the plurality of venting sections are selected such that the number of venting sections minus the number of kneading sections is greater than or equal to one, and
the conveying section, the plurality of kneading sections, and the plurality of venting sections are arranged in a configuration selected from the group consisting of:

$KV (KVCV)_n$, (1)

$(KV)_p (CV)_m$, and (2)

$(KV)_q (CV)_r (KV)_s$ (3)

wherein K is a kneading section, V is a venting section, and C is a conveying section; n is 1, 2, or 3; p is 1, 2, or 3; m is 2, 3, or 4; q is 1, 2, or 3; r is 1 or 2; and s is 1 or 2, and
(iv) extruding the plurality of reaction components at a temperature in a range between 100° C. and 500° C., wherein during the extrusion of the reaction components, ester-substituted phenol is removed through the back venting section and the plurality of venting sections disposed between the feed section and the polycarbonate exit section, and polycarbonate is removed through the polycarbonate exit section.

19. The method of claim 18, wherein the conveying section, the plurality of kneading sections, and the plurality of venting sections, are arranged in the following configuration:

$KV (KVCV)_n$, wherein K is a kneading section; V is a venting section; C is a conveying section; and n is 1, 2, or 3.

20. The method of claim 19, wherein n is 2.

21. The method of claim 18, wherein the conveying section, the plurality of kneading sections, and the plurality of venting sections, are arranged in the following configuration:

$(KV)_p (CV)_m$, wherein K is a kneading section; V is a venting section; C is a conveying section; p is 1, 2, or 3; and m is 2, 3, or 4.

22. The method of claim 21, wherein p is 2 and m is 3.

23. The method of claim 18, wherein the conveying section, the plurality of kneading sections, and the plurality of venting sections, are arranged in the following configuration:

$(KV)_q (CV)_r (KV)_s$ wherein K is a kneading section; V is a venting section; C is a conveying section; q is 1, 2, or 3; r is 1 or 2; and s is 1 or 2.

24. The method of claim 23, wherein q is 2, r is 1, and s is 1.

25. The method of claim 17, wherein the ester-substituted phenol is selected from the group consisting of phenyl salicylate, methyl salicylate, ethyl salicylate, isopropyl salicylate and benzyl salicylate.

26. An extruder comprising: (a) a feed section; (b) a polycarbonate exit section; and (c) a reaction section, disposed between the feed section and the polycarbonate exit section, comprising at least one conveying section having a screw element configuration consisting of one or more conveying elements, a plurality of kneading sections wherein each kneading section creates a melt seal within the extruder during its-operation of the extruder, wherein each of the kneading sections has a screw element configuration comprising a kneading element, and a plurality of venting sections, wherein
the plurality of kneading sections and the plurality of venting sections are selected such that the number of venting sections minus the number of kneading sections is greater than or equal to one, and
the conveying section, the plurality of kneading sections, and the plurality of venting sections are arranged in a configuration selected from the group consisting of:

$KV (KVCV)_n$, (1)

$(KV)_p (CV)_m$, and (2)

$(KV)_q (CV)_r (KV)_s$ (3)

wherein K is a kneading section, V is a venting section, and C is a conveying section; n is 1, 2, or 3; p is 1, 2, or 3; m is 2, 3, or 4; q is 1, 2, or 3; r is 1 or 2; s is 1 or 2.

27. The extruder of claim 26, wherein the conveying section, the plurality of kneading sections, and the plurality of venting sections, are arranged in the following configuration:

$$KV\,(KVCV)_n,$$

wherein K is a kneading section; V is a venting section; C is a conveying section; and n is 1, 2, or 3.

28. The extruder of claim 27, wherein n is 2.

29. The extruder of claim 26, wherein the conveying section, the plurality of kneading sections, and the plurality of venting sections, are arranged in the following configuration:

$$(KV)_p\,(CV)_m,$$

wherein K is a kneading section; V is a venting section; C is a conveying section; p is 1, 2, or 3; and m is 2, 3, or 4.

30. The extruder of claim 29, wherein p is 2 and m is 3.

31. The extruder of claim 26, wherein the conveying section, the plurality of kneading sections, and the plurality of venting sections, are arranged in the following configuration:

$$(KV)_q\,(CV)_r\,(KV)_s$$

wherein K is a kneading section; V is a venting section; C is a conveying section; q is 1, 2, or 3; r is 1 or 2; and s is 1 or 2.

32. The extruder of claim 31, wherein q is 2, r is 1, and s is 1.

33. The extruder of claim 26, wherein the extruder is a double screw extruder or a multiple screw extruder.

34. The method of claim 1, wherein each kneading section creates a melt seal within the extruder during operation of the extruder.

35. The method of claim 18, wherein each kneading section creates a melt seal within the extruder during operation of the extruder.

* * * * *

UNITED STATES PATENT AND TRADEMARK OFFICE
CERTIFICATE OF CORRECTION

| | |
|---|---|
| PATENT NO. | : 7,485,694 B2 |
| APPLICATION NO. | : 11/275266 |
| DATED | : February 3, 2009 |
| INVENTOR(S) | : Davis et al. |

Page 1 of 1

It is certified that error appears in the above-identified patent and that said Letters Patent is hereby corrected as shown below:

Column 26, Claim 26, Lines 47 through 49 should read -- kneading section creates a melt seal within the extruder during operation of the extruder, wherein each of the kneading sections has a screw element configuration comprising a --.

Signed and Sealed this

Twenty-fourth Day of March, 2009

JOHN DOLL
*Acting Director of the United States Patent and Trademark Office*